United States Patent [19]
Kawasaki et al.

[11] Patent Number: 5,969,828
[45] Date of Patent: Oct. 19, 1999

[54] DIGITAL COPYING MACHINE, IMAGE READING DEVICE USED IN SAID DIGITAL COPYING MACHINE, AND IMAGE PROCESSING METHOD USED IN THESE DEVICES

[75] Inventors: Eiichiro Kawasaki, Toyokawa; Takeshi Morikawa, Okazaki; Tomoyuki Atsumi, Toyohashi; Eiichi Yoshida, Toyokawa; Yoshikazu Ikenoue, Toyohashi, all of Japan

[73] Assignee: Minolta Co., Ltd., Osaka, Japan

[21] Appl. No.: 08/942,396

[22] Filed: Oct. 10, 1997

[30] Foreign Application Priority Data

Mar. 12, 1997 [JP] Japan ................................. 9-057468
Mar. 12, 1997 [JP] Japan ................................. 9-057470

[51] Int. Cl.$^6$ .................................................. H04N 1/41
[52] U.S. Cl. ......................... 358/426; 358/433; 382/234; 382/297
[58] Field of Search .................................... 358/426, 432, 358/433, 449; 382/232, 234, 296, 297

[56] References Cited

U.S. PATENT DOCUMENTS

| | | | |
|---|---|---|---|
| 5,033,106 | 7/1991 | Kita | 358/426 |
| 5,148,292 | 9/1992 | Kutaragi | 358/433 |
| 5,420,693 | 5/1995 | Horiuchi et al. | 358/433 |
| 5,751,865 | 5/1998 | Micco et al. | 358/426 |

FOREIGN PATENT DOCUMENTS

| | | |
|---|---|---|
| 03241963 | 10/1991 | Japan . |
| 04095471 | 3/1992 | Japan . |
| 7-32459 | 4/1995 | Japan . |

*Primary Examiner*—Thomas D. Lee
*Attorney, Agent, or Firm*—McDermott, Will & Emery

[57] ABSTRACT

In the image data processing of the digital copying machine (M), number of blocks Bn of image data in auxiliary scanning direction is set to the number of expanders (30, 31) Dn times a natural number N (N×Dn). This configuration makes it possible to utilize the (30, 31) expanders efficiently regardless of whether the image is to be rotated by 90° or not when expanding compressed image data and printing the image. Thus such a situation that the expanders (30, 31) are forced to suspend the expanding operation does not occur, making it possible to start printing earlier and improve the printing speed. In the image reader 1 of the digital copying machine (M), when dividing image data corresponding to original document into a plurality of blocks and compressing the image data in the unit of block, length of the original document in the auxiliary scanning direction is estimated from width of the original document (size in principal scanning direction). Then by setting the partition of divided blocks based on the estimated document length, the image data can be compressed without waiting for the end of image data input for each block, not doing over the compression process even when the end of the original document is detected, thereby maximizing the image data compressing speed.

18 Claims, 23 Drawing Sheets

※ORDER OF COMPRESSION
  1ST COMPRESSOR  (1)→(2)→(3)→(4) →(5) →(6)
  2ND COMPRESSOR  (7)→(8)→(9)→(10)→(11)→(12)

※ORDER OF EXPANSION 1
  1ST EXPANDER  (1)→(2)→(3)→(4) →(5) →(6)
  2ND EXPANDER  (7)→(8)→(9)→(10)→(11)→(12)

※ORDER OF EXPANSION 2
  1ST EXPANDER  (4)→(5)→(6)→(10)→(11)→(12)
  2ND EXPANDER  (1)→(2)→(3)→(7) →(8) →(9)
                         ▲
                    START OF OUTPUT

※ORDER OF COMPRESSION
  1ST COMPRESSOR  (1)→(2)→(3)→(4)→(5)
  2ND COMPRESSOR  (6)→(7)→(8)→(9)→(10)

※ORDER OF EXPANSION 1
  1ST EXPANDER  (1)→(2)→(3)→(4)→(5)
  2ND EXPANDER  (6)→(7)→(8)→(9)→(10)

※ORDER OF EXPANSION 2
  1ST EXPANDER  (3)→(4)→(5)→(9)→(10)→(X)
  2ND EXPANDER  (1)→(2)→(X)→(6)→(7)→(8)
                     ▲
              START OF OUTPUT

DIGITAL COPYING MACHINE, IMAGE READING DEVICE USED IN SAID DIGITAL COPYING MACHINE, AND IMAGE PROCESSING METHOD USED IN THESE DEVICES

BACKGROUND OF THE INVENTION

1. Field of the Invention

The present invention relates to a digital copying machine, an image reading device used in the digital copying machine to take in the image of an original document, compress the image data and store it in an image memory, and an image processing method used in these devices. More particularly, it relates to improvements in techniques of compressing and expanding image data used in the digital copying machine, and to improvements in image data compressing device or transferred document reading/compressing device used in a digital copying machine, a facsimile or the like which is provided with an automatic document feeding device.

2. Description of the Prior Art

In a digital copying machine, a facsimile or the like, in general, image data (image information) obtained by reading an original document (picture) with an image reading device is temporarily stored in an image memory, and a duplicate image of the original document is printed by using the image data stored in the image memory. Therefore, such a digital copying machine or a facsimile has an advantage that, once an original document has been read, the image data stored in the image memory can be used thereafter to print a plurality of duplicate copies of the original document, edit the image data and print it out, or transmit the original document via facsimile a plurality of times.

Such a digital copying machine or a facsimile generally handles a fairly great amount of data. Thus in order to reduce the requirement for the image memory capacity of storing image data, or to increase the speed of processing image data, the image data obtained by reading original document is compressed by means of a compressor before storing it in the image memory. Then, when the duplicate image is to be printed or transmitted via facsimile based on the image data, the compressed image data stored in the image memory is expanded into the original image data.

In such a digital copying machine or a facsimile of the prior art, compression and expansion of the image data have been carried out separately for every sheet of original document.

Copying of one sheet of original document in a digital copying machine, for example, is carried out in the following procedure.

(1) One sheet of the original document is read and image data corresponding to the original document is stored in an input image memory.

(2) Image data for one sheet of the original document stored in the input image memory is compressed and stored in a compressed image memory.

(3) Image data for one sheet of the original document stored in the compressed image memory is expanded and stored in an output image memory.

(4) A duplicate image of the original document is printed out based on the expanded image data stored in the output image memory.

With the conventional image data processing method (compression and expansion techniques) described above, however, the image data is expanded after compression of the image data for one sheet of original document has been completed. This leads to a problem that longer time is required to process the image data, resulting in a delay in starting to print the image. To counter this problem, such a digital copying machine provided with an image memory has been proposed that image data obtained by reading an original document is divided into a plurality of blocks each having a specified number of lines, with the blocks of data being compressed separately, and the compressed blocks are expanded successively by starting with the block which has been compressed first, thereby enabling it to start printing earlier. In this case, when compression of the first image data block is completed, for example, the first block can be expanded at the same time as the second block is compressed. Therefore, except for the initial and final stages of processing the image data, compression and expansion of image data can be performed simultaneously resulting in reduced time required for processing the image data.

In order to increase the copying speed further, such a digital copying machine has also be proposed that starts printing of image data during expansion of compressed image data.

When printing of image data is to be started before expansion of the image data is completed, timing of starting to print must be set carefully so that the progress of printing does not outrun the progress of expansion. In case the printing speed is slower than the expanding speed, progress of printing does not outrun the progress of expansion even when printing is started immediately after starting the expansion of the image data. However, because the printing speed is generally faster than the expanding speed, timing of starting to print must be set by predicting the time when expansion will be completed, so that the progress of printing does not outrun the progress of expansion. Thus in case all blocks are expanded at the same speed (e.g. lowest speed), different expanders do not complete expanding operations at the same time when the size and/or number of blocks assigned to the expanders are different. In this case, some of the expanders are forced to suspend the expanding operation, resulting in decreased efficiency of using the plurality of expanders. Also in case image data is divided along the principal scanning (horizontal) direction into a plurality of blocks and printing is started while the image data is being expanded, start time of printing is determined by the block which would take the longest time to expand. This causes the start of printing to be later than in the case where expanding operations for all blocks end at the same time.

In case the image data is divided along the auxiliary scanning (vertical) direction into five blocks and also divided along the principal scanning (horizontal) direction into two blocks thereby to compress the blocks while using first and second expanders in expanding the blocks, expanding the left side block of the compressed image data with the first expander and expanding the right side block with the second expander naturally results in higher expanding speed than in the case where only one expander is used. Also in case the image data is expanded at a uniform expanding speed (e.g. at the lowest expanding speed), both expanders complete expansion at the same time because the right and left blocks have the same sizes.

However, in case the image data divided along the auxiliary scanning direction into five blocks and also divided along the principal scanning direction into two blocks is rotated by 90° during expansion as shown in FIG. 8, the expanded image data which is sent to the output image memory is converted to image data which is divided into two blocks in the auxiliary scanning direction and divided into five blocks in the principal scanning direction. Consequently, number of blocks in each row (band) becomes five when viewed in the order of output (order of printing), while the first expander and the second expander expand different numbers of blocks with regard to the expansion of each row (e.g. the first expander expands three blocks and the second expander expands two blocks). Therefore, the expanders cannot complete expanding operations at the same time. This results in lower efficiency of expander operation because one expander remains in operation while the other expander is not in operation. Also when the image data is rotated by 90°, direction of expansion is different from the direction of printing and therefore printing of a row cannot be started unless expansion of the row is completed. Therefore, when expanding the image data of each row in this case, end time of expansion for the row becomes later than that in such a case as two expanders complete the expanding operations at the same time, resulting in corresponding delay in the start of printing.

The conventional image reading apparatus of such a digital copying machine or facsimile usually starts compression of image data after completing the process of reading one sheet of original document and storing the image data of the one sheet of original document in the input image memory. This results in such a problem that longer time is taken from the start of reading the original document to the end of compressing the image data.

To counter such problems, such an image reading device for digital copying machine or facsimile has recently been proposed that starts compression of image data without waiting the reading of image data to be completed and thereby reduces the time taken in data processing as a whole. In this case, it is necessary that the length of the ordinal document in the auxiliary scanning direction is known beforehand and the length to be continuously compressed must be set according to the length of the ordinal document. Thus compression speed varies depending on the type of image (text, photograph, etc.) although the speed of reading the input image is nearly constant. As a result, when the predicted highest compression speed is faster than the speed of taking in the input image, compression overruns the input thereby causing the data processing to stop at the instant, unless the length of image data to be compressed continuously is set and proper time to start compression is determined according to the length. That is, when the length of the original document to be scanned is not known, the length of image data to be compressed continuously cannot be determined, and therefore compression of the image data cannot be started until reading of the original document is completed.

However, it is very difficult to determine the length of the original document before reading. Such a method may be employed as a sensor for detecting the length of the original document is installed on a paper feeder tray of an automatic document feeder. With this configuration, however, when original document sheets of different sizes are placed on the paper feed tray at the same time, length of the original document to be read cannot be detected.

Also in case compression of image data is started by setting the length of the original document to be continuously compressed before the length of the original document is established, when the original image is shorter than the length to be continuously compressed, other image data than that on the input image memory is mistakenly compressed. Thus such a problem arises as compression must be done over again when the end of original document is detected, by interrupting the compression and setting the length to be continuously compressed once again.

To counter such a problem, a method of compressing image data by dividing it into blocks of specified length has been proposed, where the length of image data to be continuously compressed is set to a specified value and accordingly compression is carried out when input of image of that length is recognized.

With this method, however, compression cannot be started until the input of image data in blocks of the specified length is completed. Thus although compression can be started before the input of image data of one sheet of original document is completed, compression cannot be started until the input of image data of one block length is completed, in the unit of block.

SUMMARY OF THE INVENTION

The present invention has been made to solve the problems of the prior art described above, and has an object of providing a digital copying machine which can cause expanders to operate efficiently and minimize the time required to expand the data, thereby enabling it to start printing earlier. Another object of the present invention is to provide a digital copying machine which can capture image and compress image data in shorter time even when length of the original document to be read is not known at the start of reading the original document.

According to the first aspect of the present invention contrived to solve the above problems, there is provided a digital copying machine, including a document reader for reading an original document and generating image information corresponding to the original document; an image information dividing manager for dividing the image information generated by the document reader at least in the auxiliary scanning direction into a plurality of image information blocks; a compressor which compresses the image information in the unit of blocks; a plurality of expanders which expand the compressed image information in the unit of blocks; a printing device for printing duplicate image of the original document; and a number of blocks setting device for setting the number of blocks, into which the image information is to be divided along the auxiliary direction, to an integral number times the number of the expanders.

The digital copying machine is preferably provided with an image data editor which can rotate the compressed image information by 90° and output it to the expander side (printing device side).

The digital copying machine is also preferably provided with the same number of compressors as the number of expanders.

It is also preferable in the digital copying machine, that the blocks have the same sizes.

The digital copying machine is further preferably provided with a block assigning device for assigning the blocks to be expanded to the expanders so that processing operations in the expanders are not interrupted during expansion of image information.

It is also preferable in the digital copying machine that the order of expanding the compressed information blocks differs depending on whether the compressed image information is to be output after being rotated by 90° or to be output without rotation.

It is also preferable in the digital copying machine that the printing device performs printing operation in parallel with the expanding operation of the expanders.

According to the second aspect of the present invention, there is provided a method of image processing in an image forming device which reads an original document and reproduces the image of the original document on paper sheets, which includes the step of reading the original document and generating image information which corresponds to the original document; dividing the image information at least in the auxiliary scanning direction thereby to form a plurality of image information blocks; compressing the image information divided into blocks, expanding the blocks of the compressed image information in parallel; and reproducing the original document by printing the expanded image information on paper sheets, wherein the number of blocks in the auxiliary direction is set to an integral number times the number of expanding processes which can be performed simultaneously in the step of dividing the image information and forming the blocks.

In this image processing method, it is preferable that the arrangement of the image information is rotated by 90° when expanding the compressed image information in the step of expanding the image information.

In this image processing method, it is also preferable that printing of the expanded image information be carried out before expansion of all image information is completed.

Thus, according to the digital copying machine or the image processing method of the first or the second aspect of the present invention, because image data is compressed after being divided according to a method of dividing the image data which corresponds to the number of expanders, the expanders can be operated efficiently without time loss even when expanding image data while rotating it. This makes it possible to start printing earlier, and consequently to increase the copying speed. Therefore, time of starting to print can be made earlier regardless of whether the image data is rotated or not.

According to the third aspect of the present invention, there is provided an image reading device, including a document reader for reading an original document and generating image information corresponding to the original document; an input image memory for storing the image data generated by the document reader; an image data dividing manager for dividing the image data stored in the input image memory into a plurality of blocks arranged along the auxiliary scanning direction; a compressor which compresses the image data stored in the input image memory in the unit of blocks; a document width sensor for sensing the width of the original document; and a block partition setting device for estimating the size of the original document in the auxiliary scanning direction from the original document width which is sensed by the document width sensor and setting the partition of blocks corresponding to the original document based on the estimated size.

The image reading device is based on the fact that sizes of original documents which are to be read are commonly limited to a small number of standard sizes, namely A3 to A5 and B3 to B5 sizes.

The compressor is preferably configured to start compression of image data which belong to each block before completing the generation of the image data which belongs to the block.

In the image reading device, according to the fact that sizes of original documents which are to be read are commonly limited to the standard sizes, in case length of the original document is unknown, length of the original document in the auxiliary direction is estimated from the document width which was sensed during reading of the original document, and the image data is divided into a plurality of blocks arranged in the auxiliary scanning direction according to the estimated length of the original document, and is compressed.

According to the fourth aspect of the present invention, there is provided a method of image processing in an image forming device which reads original document and reproduces the image of the original document on paper sheets, which includes the step of reading the original document and generating image data which corresponds to the original document; storing the image data in an input image memory; dividing the image data stored in the input image memory into a plurality of blocks arranged in the auxiliary scanning direction; compressing the image data, which is stored in the input image memory, in the unit of block; sensing the width of the original document; and estimating the size of the original document in the auxiliary direction from the document width and setting the partition of blocks corresponding to the original document based on the estimated size.

In this image processing method, it is preferable that compression of image data belonging to each block be started before generation of the image data which belongs to the block is completed in the step of compressing the image data.

Thus, according to the image reading device or the image processing method of the third or the fourth aspect of the present invention, the length of the original document is estimated from the document width which was sensed during reading of the original document and the image data is divided into a plurality of blocks according to the estimated length of the original document, and is compressed. Therefore, even when the length of the original document is unknown, compression can be started during reading of the original document, thereby suppressing the decrease in the reading speed and compressing speed.

According to the fifth aspect of the present invention, there is provided an image reading device, including a document reader for reading an original document and generating an image data corresponding to the original document; an input image memory for storing the image data generated by the document reader; an image data dividing manager for dividing the image data stored in the input image memory into a plurality of blocks arranged along the auxiliary scanning direction; compressors which compress the image data stored in the input image memory in the unit of blocks; expanders which expand the compressed image data in the unit of block; an end of document detector for detecting end of the original document in the auxiliary scanning direction; and an ineffective area detector which, when the end of the original document is detected by the end of document detector during compression of image data belonging to one block, memorizes the area from a line corresponding to the end of the document to a line corresponding to a position where compression of the block ends as an ineffective area and causes the expanders to expand the image data of the block while taking the ineffective area into account.

The image reading device preferably includes an original document transfer mechanism which transfers the original document to the original document reading position.

The image reading device is preferably configured so that the original document is read by the document reader while being transferred.

According to the sixth aspect of the present invention, there is provided a method of image processing in an image forming device which reads original document and reproduces the image of the original document on paper sheets, including the steps of reading the original document and generating image data which corresponds to the original document; storing the image data in an input image memory; dividing the image data stored in the input image memory into a plurality of blocks arranged in the auxiliary scanning direction; compressing the image data, which is stored in the input image memory, in the unit of block; expanding the compressed image data in the unit of block; step of sensing the end of the original document in the auxiliary direction; and memorizing the area from a line corresponding to the end of the original document to a line corresponding to a position where compression of the block ends as an ineffective area and causes the expanders to expand the image data of the block while taking the ineffective area into account, when the end of the original document is detected during compression of image data belonging to one block.

Thus, according to the image reading device or the image processing method of the fifth or the sixth aspect of the present invention, even when the end of the original document is detected during compression of image data belonging to one block, compression process is continued for the ineffective area in the block. Therefore, because it is not necessary to return to the start of the block and compress the block again which is required in the prior art, time required in compression is reduced. Also because ineffective areas included in the compressed image data are excluded during expansion of the image data, no trouble is caused to the output of the image data.

BRIEF DESCRIPTION OF THE DRAWINGS

The present invention will become more apparent from the following description with reference to the accompanying drawings.

DETAILED DESCRIPTION OF THE PREFERRED EMBODIMENTS

Figure 1:
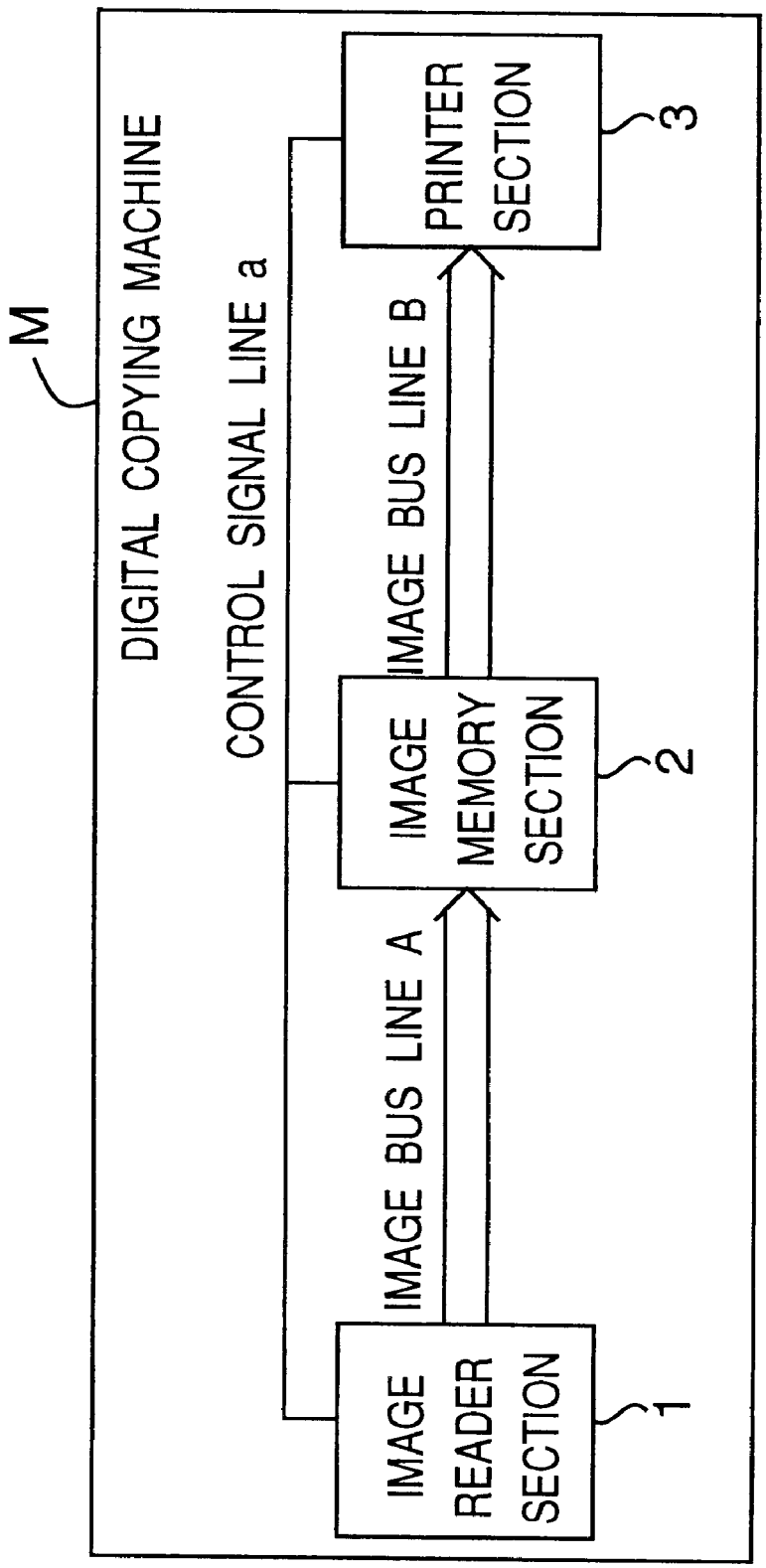
FIG. 1 is a block diagram showing the basic system construction of a digital copying machine according to the present invention.

The mode for carrying out the present invention will be described in detail hereinafter. FIG. 1 is a block diagram showing the basic system construction of a digital copying machine according to the present invention. First, configuration of the digital copying machine will be briefly described below.

As shown in FIG. 1, the digital copying machine M of the present invention has an image reader section 1 (image reading device) which reads an original document and generates image data corresponding to the original document, an image memory section 2 capable of storing image data, generated by the image reader section 1, of several sheets of the original document, a printer section 3 which prints the image of the original document according to the image data stored in the image memory 2 and an overall control section (not shown in the drawing) which controls the entire operations of the copying machine.

The image reader section 1 is an ordinary scanner which has been conventionally known and is capable of reading original documents by means of CCD or the like and generating digital image data corresponding to the original document, thereby continuously reading the original document. The image memory section 2 comprises RAM for storing the image data, a compression/expansion circuit and other components, and is capable of compressing a plurality of image data sets and storing the image data in the RAM. The printer section 3 is an ordinary printer which has been conventionally known and forms the image of the original document on paper sheets by electrostatic printing method. The image reader section 1, the image memory section 2 and the printer section 3 are connected to each other by means of a control signal wire a, an image bus line A and an image bus line B.

The control signal line a is a signal line provided for feeding of original document, reading of the original document, feeding of copy paper and setting the timing of starting the operation and printing operation, and is used for exchanging operation starting commands and current status signals. The image bus line A is a path for transmitting the image data generated (captured) by the image reader section 1 to the image memory section 2. The image bus line B is a path for transmitting the image data stored in the image memory section 2 to the printer section 3.

To copy an original document in the digital copying machine M, a document reading command is first sent to the image reader section 1 via the control signal line a. The image reader section 1 sends image data obtained by reading the original document to the image memory section 2 via the image bus line A. The image data stored in the image memory section 2 is then sent to the printer section 3 via the image bus line B. The printer section 3 forms an image of the original document on paper while keeping synchronization with the image data signal, according to the command received from the image memory section 2 via the control signal line a.

The digital copying machine M can, because of a configuration capable of storing image data of a plurality of original documents in the image memory 2, print the image of one original document repetitively or change the order of printing, by storing the image data obtained by reading the original document in the image memory 2 and repetitively sending the same image data to the printer section 3.

Figure 2:
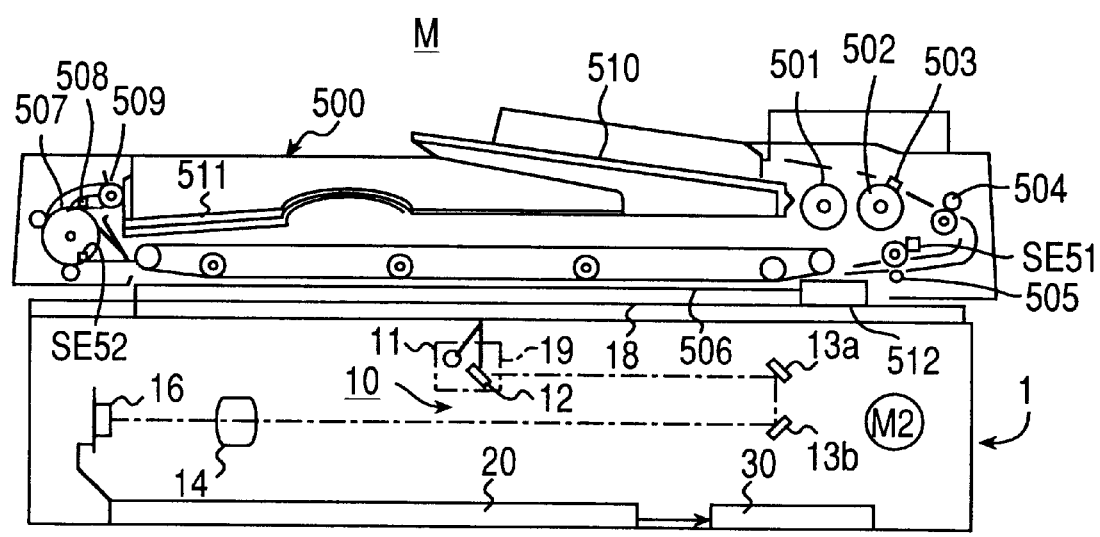
FIG. 2 is a front sectional view showing the construction of the digital copying machine shown in FIG. 1.

The specific configuration of the image reader section 1 of the digital copying machine M will be described hereinafter. FIG. 2 is a front sectional view showing the construction of the image reader section 1 of the digital copying machine M.

As shown in FIG. 2, the image reader section 1 has a reading system 10 which reads the original document and converts the image into image signals, an image signal processing section 20 which processes the image signal sent from the reading system 10 to generate image data, an image compressing section 30 which compresses the image data which is input from the image signal processing section 20 and an original document transferring section 500 which transfers the original document.

The reading system 10 has an exposure lamp 11 and first mirror 12 which are installed in a scanner 19 that moves below a document stage glass 18, second mirror 13a, third mirror 13b, a condenser lens 14, a photoelectric converter element 16 made of CCD array or the like and a scanning motor M2. The image signal processing section 20 processes the image signal sent from the photoelectric converter element 16 to generate image data and sends the image data to the image compressing section 30.

The document transfer section 500 automatically transfers original document which is set on a document feeder tray 510 to the document stage glass 18. The original document 19 is read by the scanner 19 and then discharged onto the document discharge section 511. The document transfer section 500 is provided with a document feed roller 501, a regulator roller 502, a regulator pad 503, an intermediate roller 504, a resist roller 505, a transfer belt 506, a turnover roller 507, a switching pawl 508, a document feed roller 509, a document feed tray 510, a discharge tray 511, a document scale 512, a document feed sensor SE51, a discharge sensor SE52 and a document feed sensor SE51.

Figure 3:
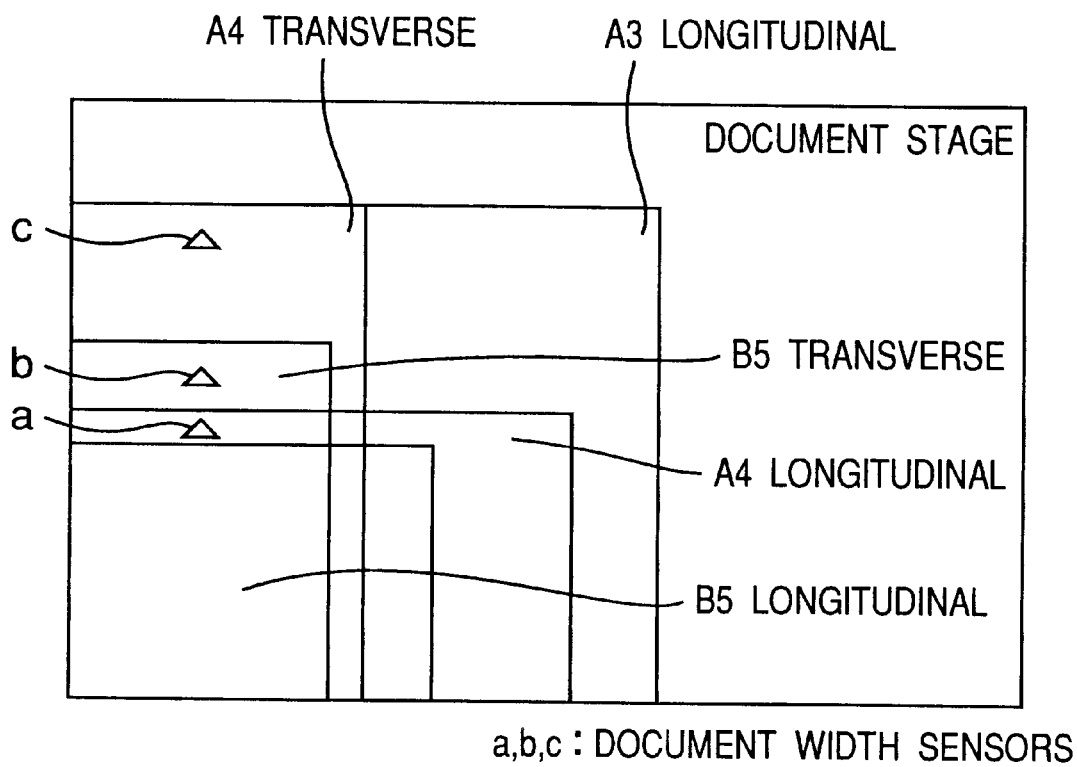
FIG. 3 is a drawing showing the position of installing an original document sensor of the digital copying machine shown in FIG. 2.

Further, as shown in FIG. 3, the document transfer section 500 is provided with first to third document width sensors a to c arranged in line in the direction of width of the document stage glass 18.

Operation of the document transfer section 500 varies depending on the original document reading mode. Original document reading modes include scanning mode where the original document is read by reading operation of the scanner 19 and transferred document reading mode where the original document is read while being transferred with the scanner 19 being kept stationary.

In the scanning mode, one or more original document sheets are placed on the document feed tray 510 with the faces to be read facing upward. When the operation is started, the document sheets are transferred by the document feed roller 501, with the sheet stacked at the bottom first. The document sheet, after being regulated by the regulator roller 502 and the regulator pad 503, passes over the intermediate roller 504 and corrected by the resist roller 505 to travel straight, thereby to be transferred by the transfer belt 506 onto the document stage glass 18. Then immediately after the trailing edge of the original document has passed the left end of the document scale 512, the transfer belt 506 moves backward a little and stops.

This causes the right edge (rear end) of the original document to touch the edge of the document scale 512, so that the original document is accurately positioned on the document stage glass 18. By this time, leading edge of the next original document sheet has reached the resist roller 505, thereby reducing the time to transfer the next document sheet. Under this condition, the scanner 19 scans to read the document surface (bottom surface). When reading of the document sheet is completed, the document sheet is transferred leftward by the transfer belt 506, turned around by the turnover roller 507, and passes over the switching pawl 508 to be discharged by the discharge roller 509 onto the discharge tray 511. At this time, the original document sheet is discharged with the surface to be read facing upward.

The transferred document reading mode will be described hereinafter. In the transferred document reading mode, the operation is linked with the scanning system 10.

In this case, although the operation is the same as that of scanning mode up to a point before the original document passes the resist roller 505, thereafter the original document sheets are transferred by the transfer belt 506 at a constant speed which corresponds to the scale of copying, and pass the turnover roller 507 and other components, thereby to be discharged onto the discharge tray 511. During this process, as the scanner 19 stays at the right edge of the document stage glass 18 and the document sheet passes above it, surface of the original document sheet being transferred is read. Therefore, such operations as positioning of document sheet by turning over, scanning and returning of the scanner 19 that are performed in the scanning mode are not carried out, thereby carrying out the reading operation at a faster speed.

Figure 4:
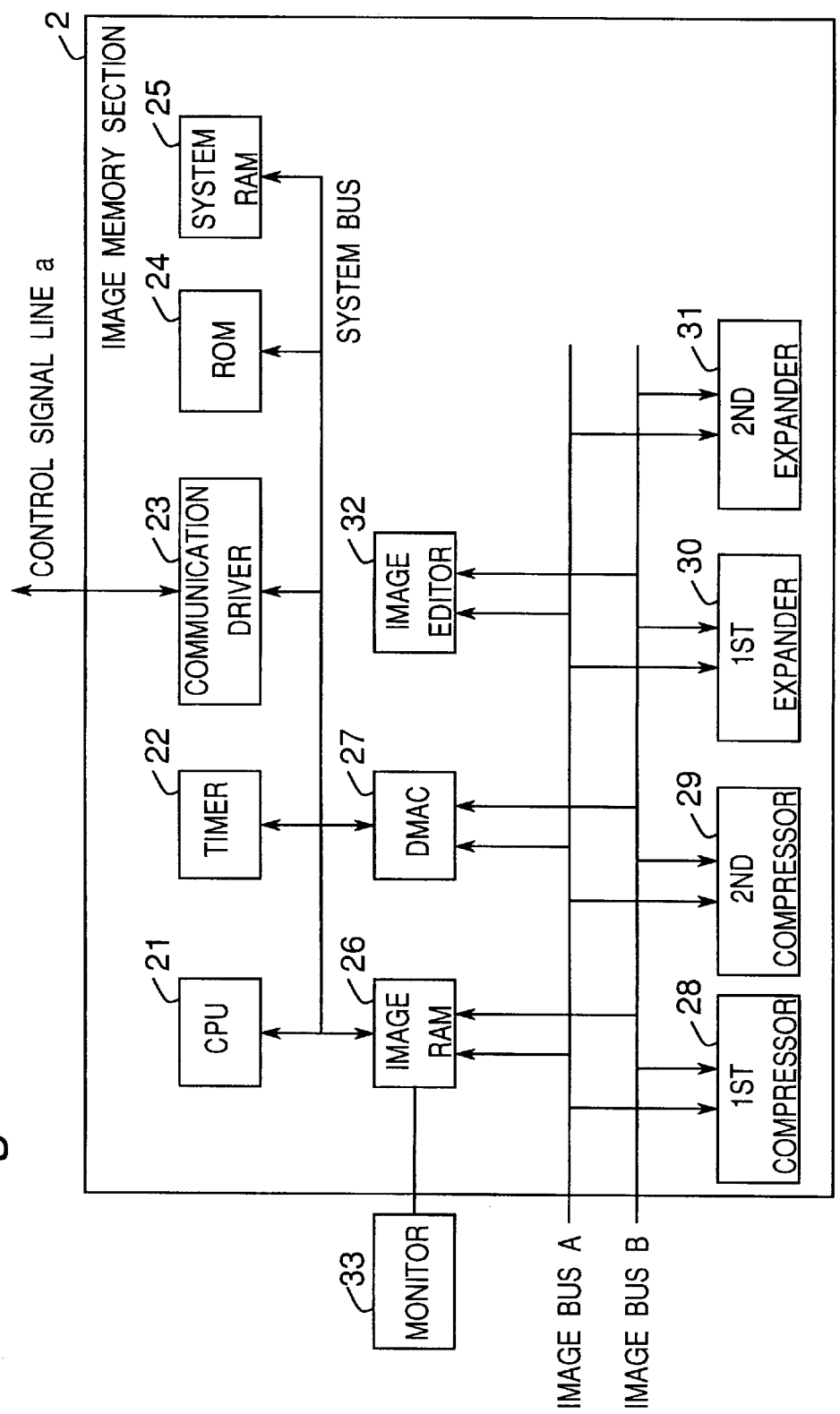
FIG. 4 is a block diagram showing the basic system construction of the digital copying machine shown in FIG. 1.

The specific configuration of the image memory section 2 of the digital copying machine M will be described hereinafter. FIG. 4 is a block diagram showing the internal configuration of the image memory section 2.

In the image memory section 2, as shown in FIG. 4, CPU 21 controls the operations according to a procedure defined by a program stored in ROM 24. The image memory 2 also communicates with the image reader section 1 and the printer section 3 via the control signal line a by means of a communication driver 23. The image memory 2 is provided with a timer 22.

The image bus line A and the image bus line B are connected to the image RAM 26, while image data is stored in the image RAM 26. Transmission of the image data is controlled by DMAC 27 which is capable of transmitting the data over several channels. Also connected to the image bus line A and the image bus line B are first compressor 28, second compressor 29, first expander 30, second expander 31 and an image editor 32 which rotates the image data, thereby making it possible to compress and expand the image data. Information on the image data stored in the image RAM 26 is stored in a system RAM 25. The system RAM 25 also stores parameters required for running the programs. Also connected to the image RAM 26 is a monitor 33.

Figure 5:
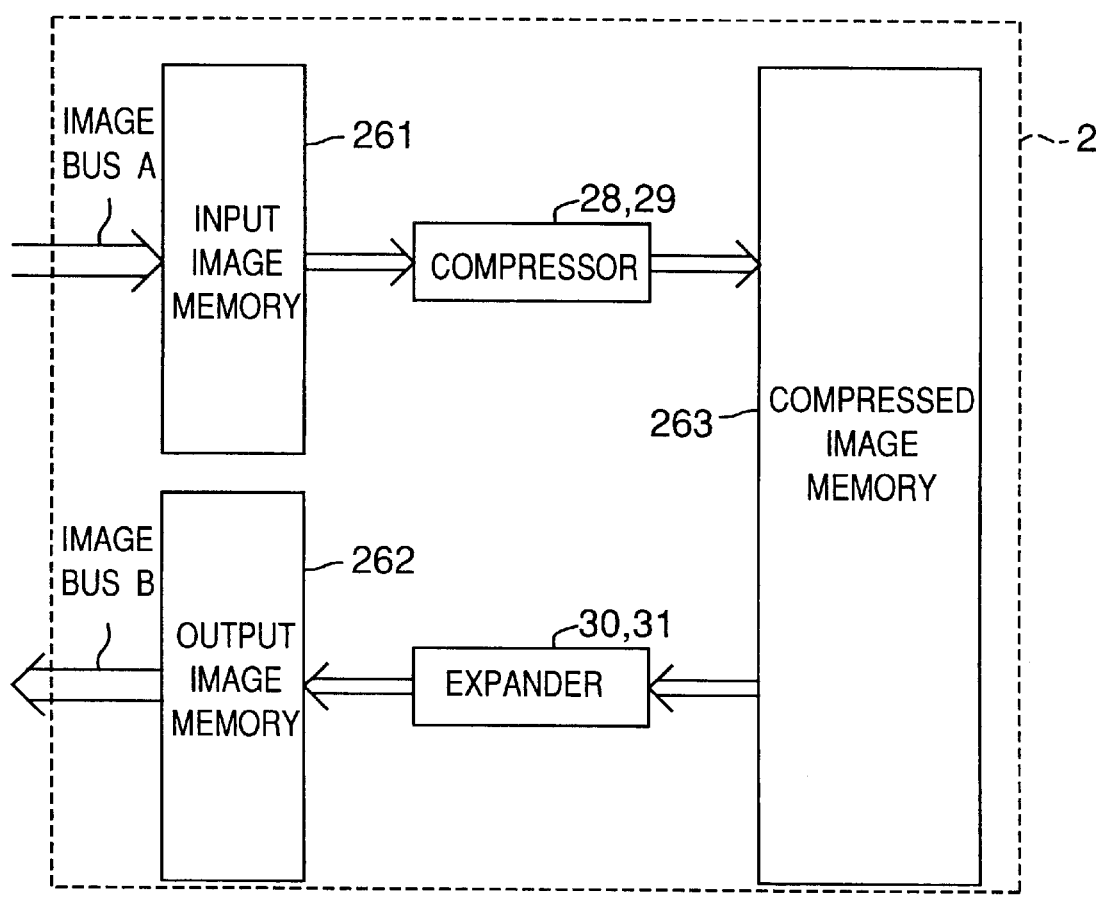
FIG. 5 is a block diagram showing the flow of image data in an image memory section shown in FIG. 4.

FIG. 5 is a block diagram showing the flow of image data in the image memory section 2. As shown in FIG. 5, the image RAM 26 (see FIG. 4) is divided into an input image memory 261, an output image memory 262 and a compressed image memory 263. Transmission of the image data between the memories 261 to 263 is controlled by the DMAC 27 (see FIG. 4). Specifically, image data is transmitted by giving a destination address and the size of data to be transmitted to the DMAC 27. The point to which the image data has been transmitted is determined by reading the transmission counter of the DMAC 27.

The image data obtained by reading the original document in the image reader section 1 is stored in the input image memory 261 via the image bus line A. As mentioned previously, the line to which the image data has been transmitted, or to which line of the input image memory 261 the image data has been input, can be determined by reading the transmission counter of the DMAC 27. The image data stored in the input image memory 261 is compressed by the first compressor 28 and the second compressor 29, and is then transmitted to the compressed image memory 263.

The compressed image data stored in the compressed image memory 263 is expanded by the first expander 30 and the second expander 31, and is then transmitted to the image editor 32 (see FIG. 4). The image data is subjected to editing processes such as rotation in the image editor 32, and is then transmitted to the output image memory 262.

The image data transmitted to the output image memory 262 is then transmitted to the printer section 3 (see FIG. 1) by the DMAC 27 via the image bus line B, so that image corresponding to the image data (original document) is printed on paper. At this time, the last line of the output image memory 262 corresponding to the image data which has been transmitted to the printer section 3 can be determined by reading the transmission counter of the DMAC 27.

The original document is copied by following the image data path described above. Image data obtained by reading the original document in the image reader section 1 is stored in the input image memory 261. At the time when one sheet of original document has been read, image data generated thereby is compressed by the first compressor 28 and the second compressor 29. The compressed image data is transmitted to the compressed image data memory 263. When the compressed image data is transmitted via the first expander 30 and the second expander 31 to the output image memory 262, it is restored into the original image data. Then by sending the image data via the image bus line B to the printer section 3, image (copy) of the original document which was read can be printed.

Now because the compressed image memory 263 can store the image data of a plurality of original document sheets, it is made possible to sort the image data by means of the compressed image memory 263 by using the functions described above. To perform sorting operation, a plurality of original document sheets are continuously read at the start. Then when the image data is stored in the input image memory 261, the image data is compressed by the first compressor 28 and the second compressor 29, with the compressed image data being stored in the compressed image memory 263.

This operation is repeated to store the compressed image data of all document sheets in the compressed image memory 263. After completing this process, image data of page 1 to page n is consecutively expanded, while the expanded data is sent to the output image data memory 262 and to the printer section 3. When the expansion and output operations are repeated the required number of times, image data can be output in the form of desired arrangement (sorted order) corresponding to the document. Therefore, sorting operation conventionally carried out mechanically can be done through data processing operations by means of memory.

Because the compressed image memory 263 can store a plurality of image data sets, a control table (compressed image control table) is implemented in the RAM 25 for controlling the image data sets.

Figure 6:
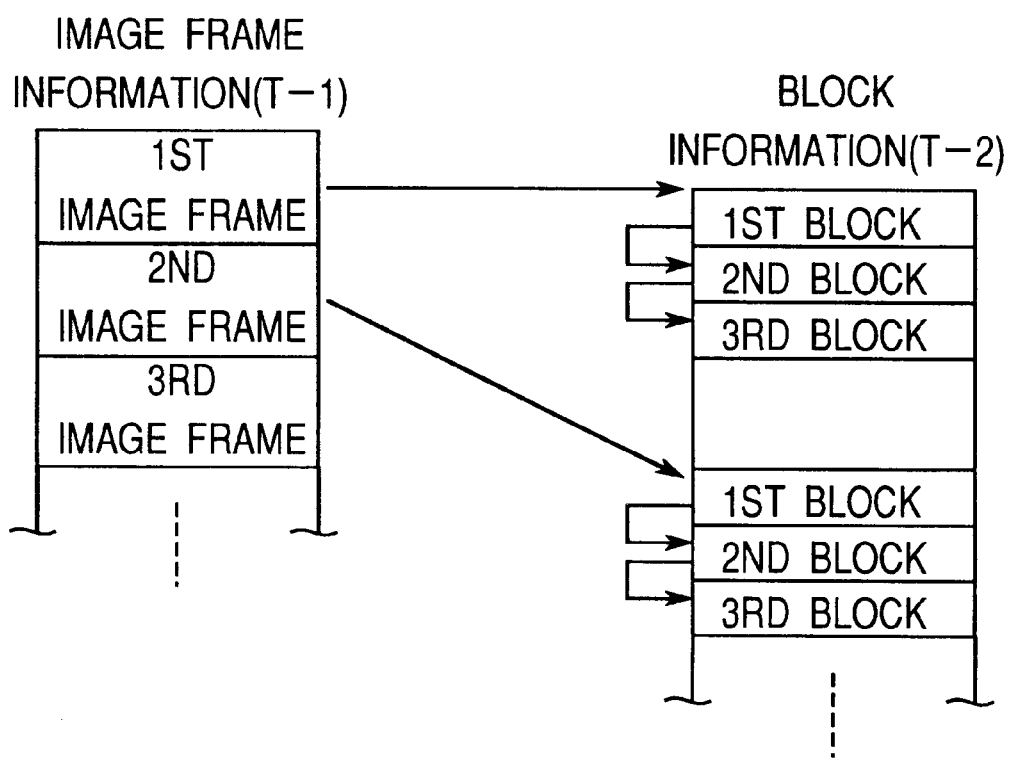
FIG. 6 is a drawing schematically showing the configuration of a compressed image control table.

As shown in FIG. 6, the table contains information (T-1) for each image frame and information (T-2) for each block. The information (T-1) for each image frame contains information of the whole image data such as the entire image data size and the end block of the image data which has been compressed.

The information (T-2) for each block contains the information of the image data blocks. As will be described later, because block size may be different from block to block, information on the number of lines contained in every block is stored. Also because a compressed image data block may include an ineffective area (ineffective image area), information on the number of lines contained in the ineffective area is stored. Further, pointer position indicating a particular area of the compressed image memory 263 where the compressed image is stored and the compressed image data size are stored.

The operation of the digital copying machine will be described hereinafter. First, an ordinary image data processing method in the digital copying machine of the present invention will be described. With this image data processing method, number of blocks Bn in the auxiliary (vertical) direction of the image data is generally set to the number of expanders Dn times a natural number N (1, 2, 3 . . . ) (N×Dn). More particularly, image data of one document sheet is divided into a plurality of blocks and the image data is compressed in the unit of block and stored in the compressed image memory. At this time, the input image data is divided and compressed in such a way that the image data blocks to be expanded by a plurality of expanders have the same sizes in the auxiliary scanning (vertical) direction and in the principal scanning (horizontal) direction in the output image memory. In this way, operations of expanding the image data by blocks in the plurality of expanders are completed at the same time, in case the expanders expand the image data at the same speed (e.g. set to the lowest speed) when expanding the image data and printing it.

Specific process of data processing in this embodiment will be described below with reference to FIG. 7. In the digital copying machine of this embodiment, because two compressors 28, 29 and two expanders 30, 31 are provided, the input image data is divided into two equal parts (n equal parts in case n compressors and n expanders are provided) in the principal scanning direction. That is, image data of one original document sheet is divided into image data located on the left (blocks (1) to (6)) and image data located on the right (blocks (7) to (12)) in the arrangement shown in the left half of FIG. 7.

Figure 7:
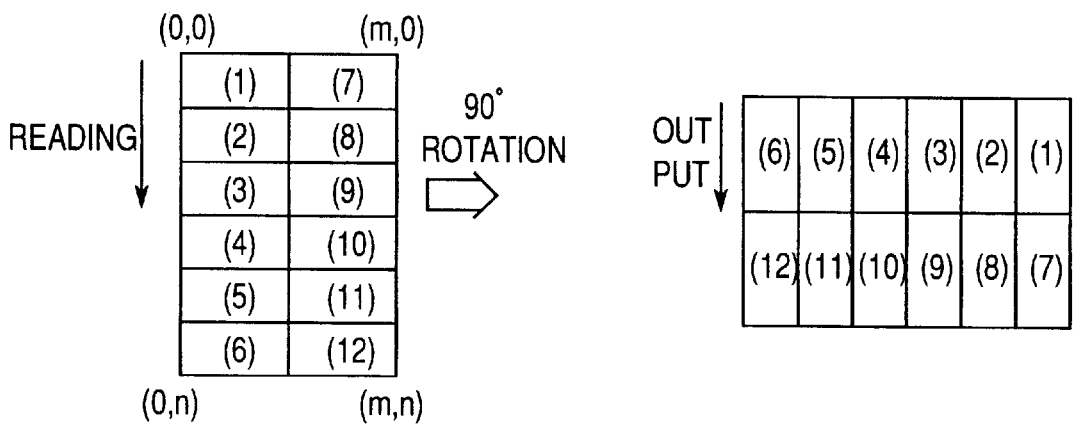
FIG. 7 is a drawing showing the method of dividing image data according to the first embodiment of the present invention.

On the other hand, because two compressors 28, 29 and two expanders 30, 31 are provided in the auxiliary scanning direction, the input image data is first divided into two equal parts (n equal parts in case n compressors and n expanders are provided) and the image data subsets made by division are divided into parts each containing the specified number of lines from the top (divided into six parts in the example shown in FIG. 7). Thus the image data located on the left is divided into 6 blocks (blocks (1) to (6)) and the image data located on the right is divided into 6 parts (blocks (7) to (12)) in the arrangement shown in the left half of FIG. 7.

Of the image data blocks (1) to (12) generated by such divisions, blocks (1) to (6) on the left are compressed by the first compressor 28 starting at the top, and blocks (7) to (12) are compressed by the second compressor 29 starting at the top, successively.

When expanding the compressed image blocks without rotating the image, the first expander 30 expands the blocks (1) to (6) on the left side successively starting at the top. And the second expander 31 expands the blocks (7) to (12) on the right side successively starting at the top. Then the printer section 3 starts to print at a time when printing can be started (expansion procedure 1). That is, as shown in FIG. 7, the first expander 30 expands the image data in the order of blocks (1), (2), (3), (4), (5) and (6), and the second expander 31 expands the image data in the order of blocks (7), (8), (9), (10), (11) and (12).

In case the image is rotated by 90° clockwise, for example, the first expander 30 expands the compressed image data blocks (4) to (6) and (10) to (12) located on the left half of the compressed image data successively starting at the top (right half of FIG. 7). And the second expander 31 expands the compressed image data blocks (1) to (3) and (7) to (9) located on the right half of the compressed image data successively starting at the top. Then the printer section 3 starts to print at a time when printing is enabled (expansion procedure 2). That is, as shown in FIG. 7, the first expander 30 expands the image data in the order of blocks (4), (5), (6), (10), (11) and (12), and the second expander 31 expands the image data in the order of blocks (1), (2), (3), (7), (8) and (9).

Thus in case the expanders expand the image data at the same speed (at the lowest speed), the first and the second expanders complete the expanding operations at the same time for the blocks included in the same band (the blocks (1) to (6) belong to the first band and the blocks (7) to (12) belong to the second band).

Because the first expander 30 and the second expander 31 are utilized efficiently, such a situation does not occur as the first expander 30 and/or the second expander 31 is forced to suspend the expanding operation. This enables it to start printing at the earliest possible time, thereby improving the printing speed. Also because the expansion of image data can be carried out separately by the expanders 30 and 31 successively starting at the top, control of the expanding operation is simplified.

Figure 8:
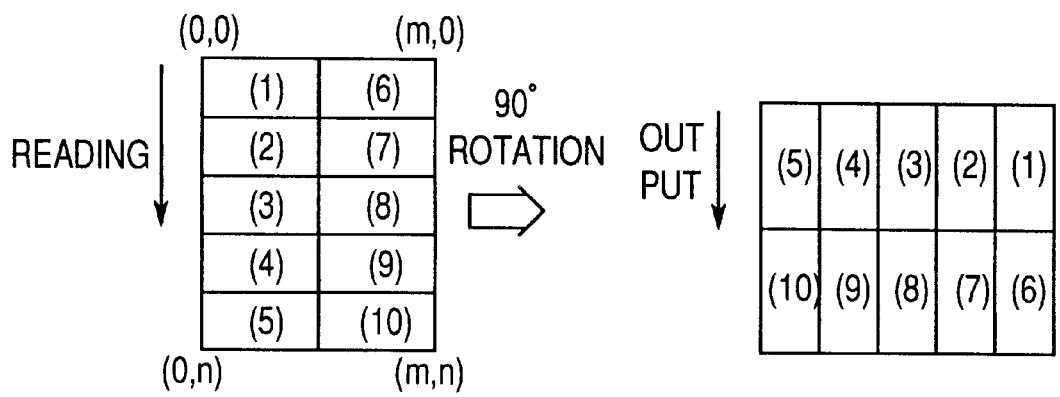
FIG. 8 is a drawing showing the method of dividing image data in the prior art.

In case the number of blocks Bn in the auxiliary scanning (vertical) direction of the image data is not set to the number of expanders Dn times a natural number N (N×Dn), for example when the image data is divided into 5 parts in the auxiliary scanning direction and is not rotated as shown in FIG. 8, the first expander 30 expands the compressed blocks (1) to (5) on the left side successively starting at the top. And the second expander 31 expands the blocks (6) to (10) on the right side successively starting at the top. Then the printer section 3 starts to print at a time when printing can be started (expansion procedure 1). In this case, such a situation does not occur as the first expander 30 and/or the second expander 31 is forced to suspend the expanding operation, and no trouble arises.

However, in case the image is rotated by 90° clockwise, the number of blocks contained in one band (the blocks (1) to (5) belong to the first band and the blocks (6) to (10) belong to the second band) cannot be divided by the number of expanders (2). Therefore, the expanders 30 and 31 cannot be assigned with the same numbers of blocks belonging to the same band to be expanded, and consequently the expanders 30 and 31 cannot complete expanding operations at the same time. Thus such a situation inevitably occurs as the first expander 30 or the second expander 31 is forced to suspend the expanding operation. This delays the start of printing and decreases the printing speed.

Specifically, as shown in FIG. 8, for the first band, the first expander 30 expands the compressed blocks (3) to (5) located on the left half of the rotated image data (right half of FIG. 8). And the second expander 31 expands the compressed blocks (1) and (2) located on the right half of the rotated image data. In this case, the second expander 31 is forced to suspend the expanding operation while the first expander 30 is expanding the block (5). For the second band, on the other hand, the first expander 30 expands, for example, the compressed blocks (9) and (10) located on the left half of the rotated image data. And the second expander 31 expands the compressed blocks (6) to (8) located on the right half of the rotated image data. In this case, the first expander 30 is forced to suspend the expanding operation while the second expander 31 is expanding the block (8) (expanding procedure 2).

The specific method of controlling the image data processing in the digital copying machine M will be described hereinafter. FIGS. 9 to 15 are flow charts of the image data processing control in the image memory section 2, showing the portions related to the present invention.

Figure 9:
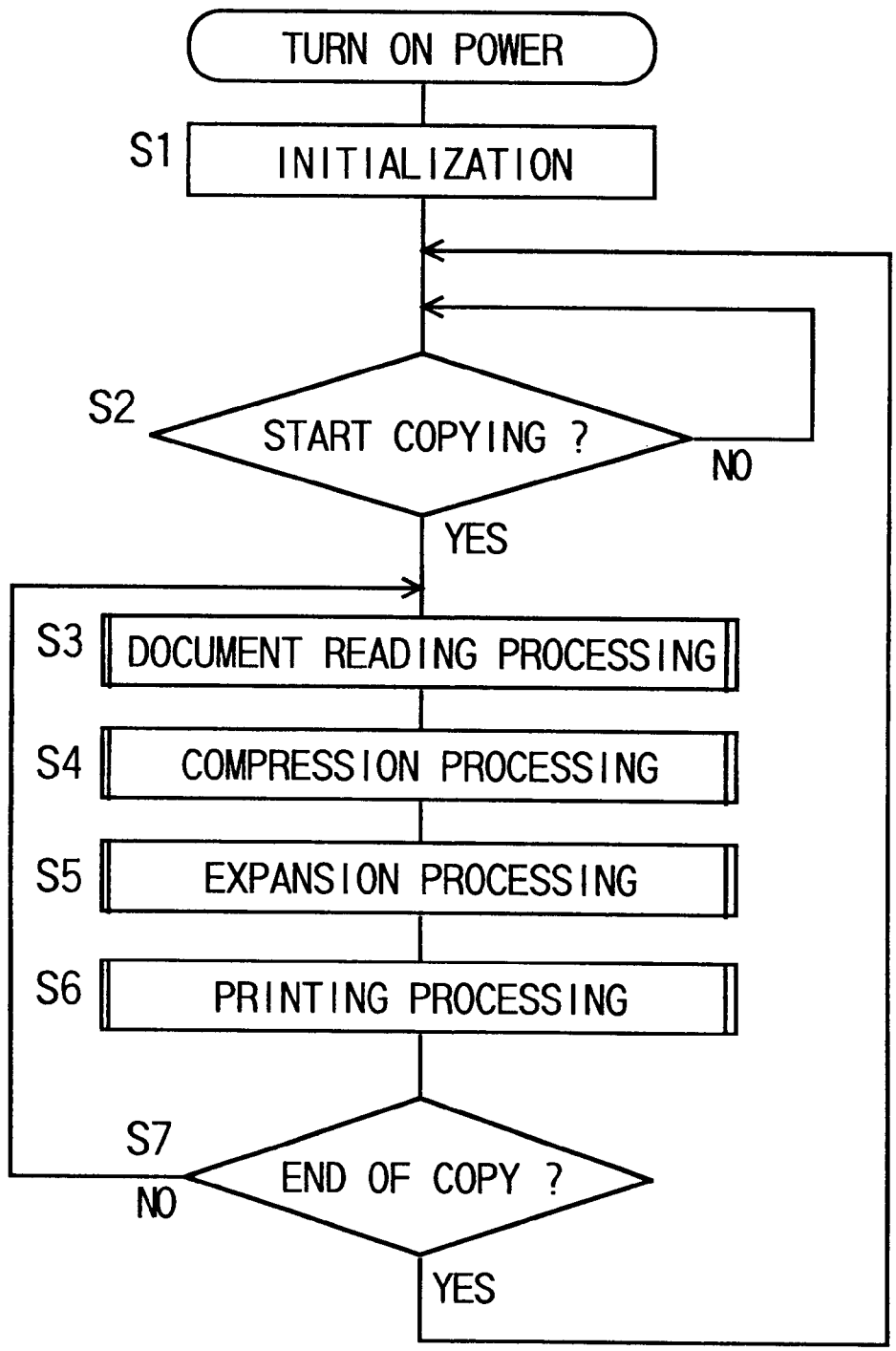
FIG. 9 is a flow chart of a main routine for image data processing control according to the first embodiment of the present invention for the digital copying machine shown in FIG. 1.

FIG. 9 shows a main routine for image data processing control. In the main routine, when power is supplied, first the internal status is initialized (step S1). Thereafter, the system remains in standby loop until start copying command is given (NO in step S2). When start copying command is given (YES in step S2), original document reading process (step S3), compression process (step S4), expansion process including image rotation (step S5) and printing process (step S6) are carried out sequentially. These steps (step S3 to step S6) are repeated until copying operation is completed (NO in step S7). When the copying operation is completed (YES in step S7), the system again waits for the start copying command.

Figure 10:
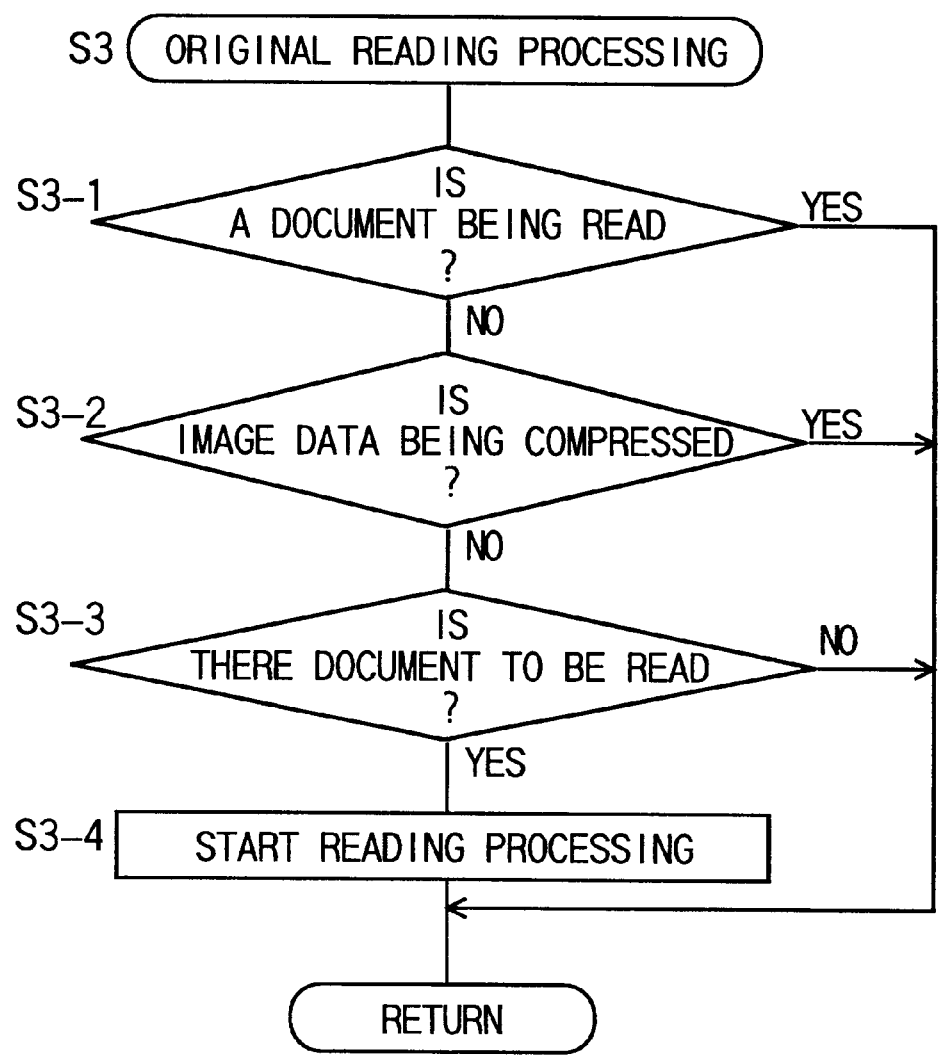
FIG. 10 is a flow chart of a subroutine for original document reading processing.

FIG. 10 is a flow chart showing a specific method of controlling the original document reading process of step S3 in FIG. 9 (subroutine). In this original document reading process, it is determined whether an original document is currently being read or not (step S3-1). When an original document is being read, namely the image reader section 1 is sending image data to the input image memory 261 of the image memory section 2, this processing routine is terminated without evoking any action (YES in step S3-1). When no original document is being read (NO in step S3-1) with no image data being compressed (NO in step S3-2) and there is an original document to be read (YES in step S3-3), reading process is started (step S3-4). The reading process here refers to a process of starting the DMAC 27 and issuing read request signal to the control signal line a to the image reader 1. In case image data is being compressed (YES in step S3-2) or there is no original document to be read (NO in step S3-3), this processing routine is terminated.

Figure 11:
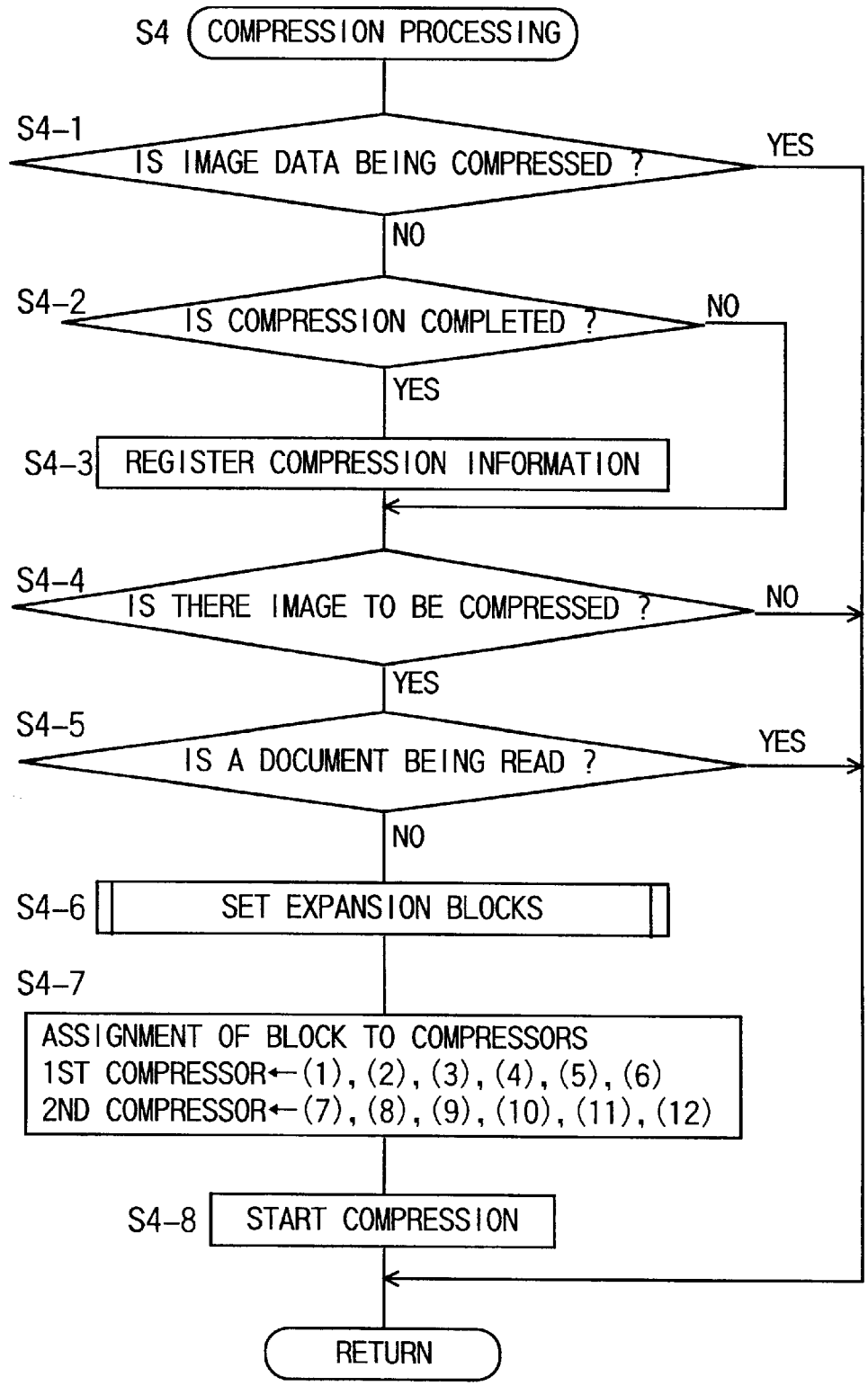
FIG. 11 is a flow chart of a subroutine for compression processing.

FIG. 11 is a flow chart showing a specific method of controlling the compression process of step S4 in FIG. 9 (subroutine). In this compression process, it is first checked to see there is no image data being compressed (NO in step S41). In case compression process has just been completed at this time (YES in step S4-2), compression information on the compressed image data is registered in the compressed image control table (YES in step S4-3). In case there is image data to be compressed, (YES in step S4-4), it is confirmed that no original document is being read (NO in step S4-5) and then expansion blocks are set (step S4-6). Then blocks are assigned to the compressors 30 and 31, namely the image data is divided into specified blocks (step S4-7) and then compression is started (step S4-8). In case no original document is being read (YES in step S4-5), this processing routine is terminated without evoking no action.

In this compression process, while the first compressor 28 and the second compressor 29 are operated, image data stored in the input image memory 261 is sent to the compressors 28, 29 to be compressed. Compressed image data is transferred to the compressed image memory 263. Transfer of the image data is controlled by the DMAC 27. How much of the image data obtained by reading the original document has been transferred to the input image memory 261 can be known through the transfer counter of the DMAC 27.

Figure 12:
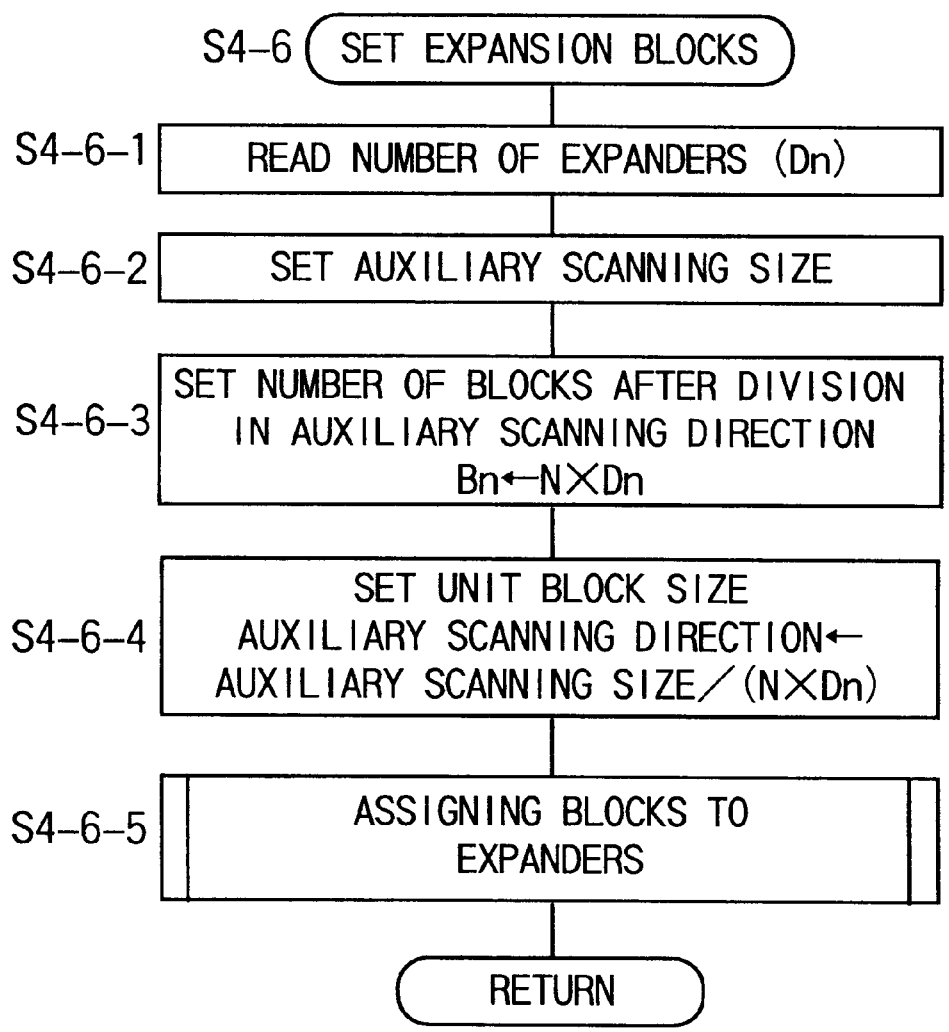
FIG. 12 is a flow chart of a subroutine for setting expansion blocks.

FIG. 12 is a flow chart showing a specific method of controlling the expansion blocks setting process of step S4-6 in FIG. 11 (subroutine). In this expansion process, first the number Dn of the expanders 30, 31 (2 in this embodiment) is read (step S4-6-1). Then the size (or length) of the image data in the auxiliary (vertical) direction is set (step S4-6-2).

Then the number of blocks Bn into which the image data obtained by reading the original document is to be divided in the auxiliary scanning direction is set (step S4-6-3).

The number of blocks Bn is the number of expanders Dn times a natural number N (N×Dn). Value of N may be selected from 1, 2, 3, 4, . . . according to the size of the image data in the auxiliary scanning direction. While greater size of block in the auxiliary scanning direction leads to higher compression efficiency, it also increases the time taken to complete compression, resulting in slower timing of starting the printing operation. In the case of this embodiment, for example, because proper size of one block size in the auxiliary scanning direction is considered to be 60 mm, value of N is set so that the size of one block becomes near 60 mm based on the size of the image data in the auxiliary scanning direction and the number of expanders. Here it is presumed that the size of expanded block in the auxiliary scanning direction is the same as that of a compressed block.

Thus unit block size in the auxiliary scanning direction is set by dividing the size of the image data in the auxiliary scanning direction by (N×Dn) according to the division technique described above (step S4-6-4). Then blocks are assigned to the expanders 30, 31 (step S4-6-5).

Figure 13:
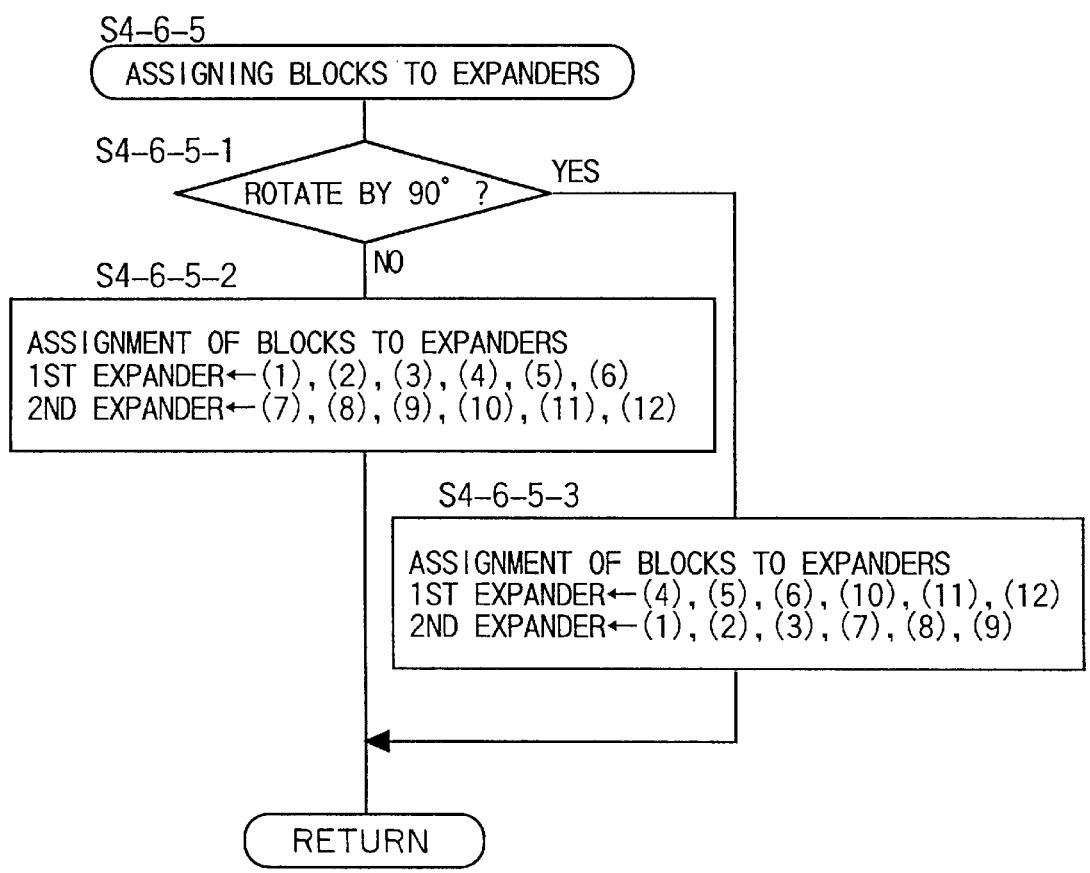
FIG. 13 is a flow chart of a subroutine for assigning blocks to each expander.

FIG. 13 is a flow chart showing a specific method of assigning blocks to the expanders of step S4-6-5 in FIG. 12 (subroutine). In this block assigning process, it is determined whether the image is to be rotated by 90° or not (step S4-6-5-1). When the image is not to be rotated (YES in step S4-6-5-1), in the example shown in FIG. 7, for example, blocks (4) to (6) and (10) to (12) are assigned to the first expander 30 while blocks (1) to (3) and (7) to (9) are assigned to the second expander 31 (step S4-6-5-3).

Figure 14:
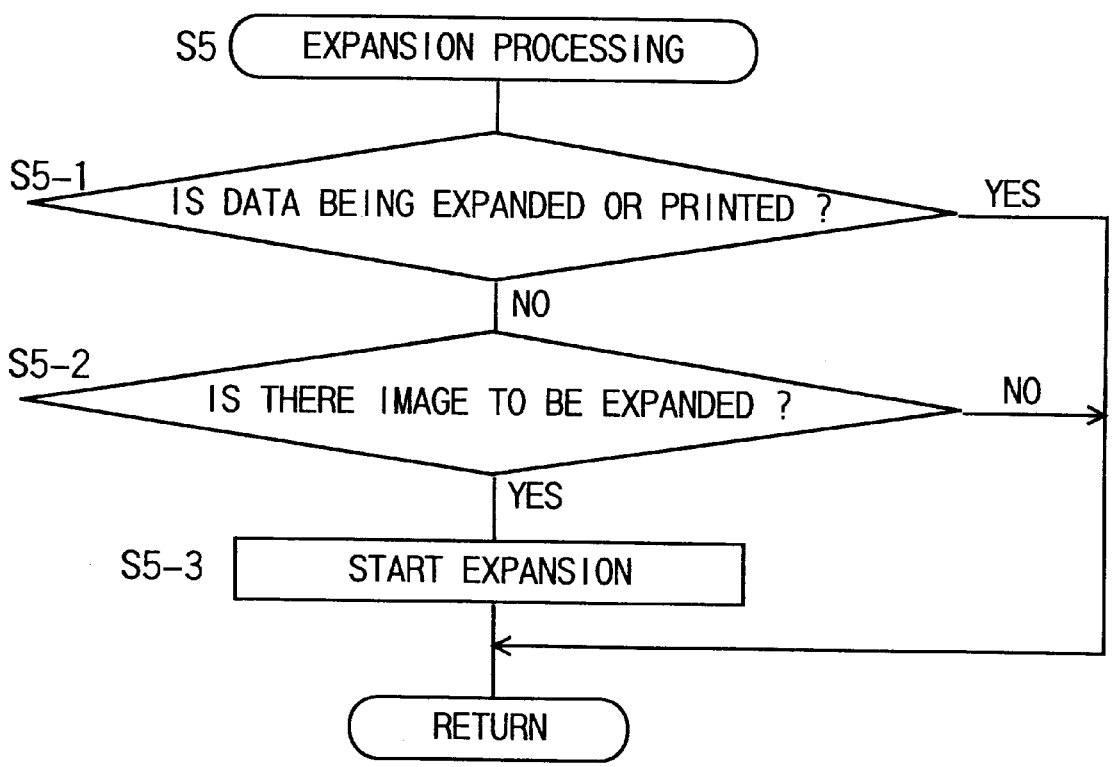
FIG. 14 is a flow chart of a subroutine for expansion processing.

FIG. 14 is a flow chart showing a specific method of controlling the expansion process of step S5 in FIG. 9 (subroutine). In this expansion process, it is first checked to see there is no image data being expanded or printed (NO in step S5-1), and then it is determined from the compression image control table to see whether there is image data to expanded (step S5-2). When there is image data to be expanded (YES in step S5-2), expansion process is started (step S5-3). Expansion process is carried out by determining the order of expanding the blocks generated by dividing the image according to the angle of rotating the image during expansion, and starting the expanders 30, 31. Transfer of the image data is carried out by the DMAC 27.

Figure 15:
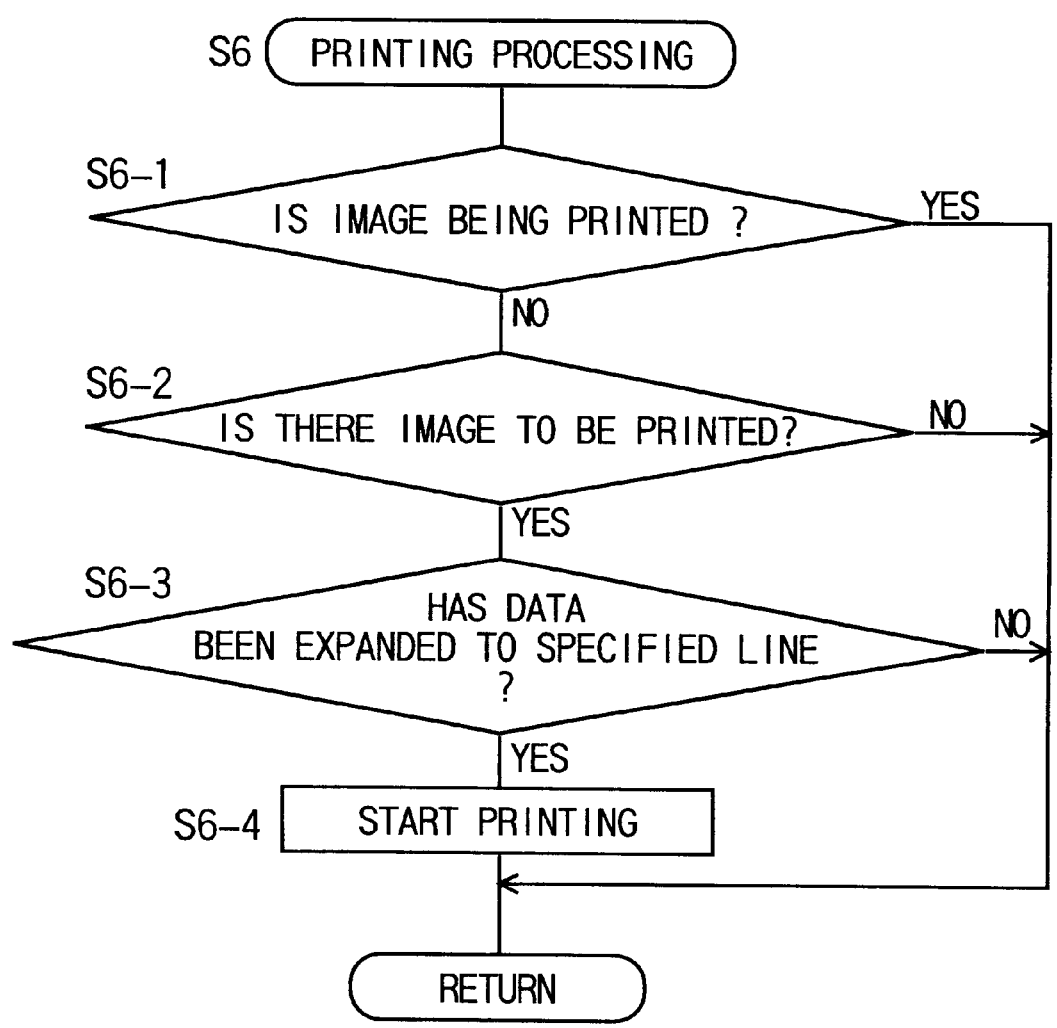
FIG. 15 is a flow chart of a subroutine for printing processing.

FIG. 15 is a flow chart showing a specific method of controlling the printing process of step S6 in FIG. 9 (subroutine). In this printing process, it is first checked to see there is no image data being printed (NO in step S6-1), and then it is determined whether there is image data to be printed (step S6-2). When there is image data to be printed (YES in step S6-2), after confirming that the image data has been expanded up to the print enable line (YES in step S6-3), printing process is started (step S6-3).

In this printing process, after starting the DMAC 27, the printer section 3 is requested via the control signal line a to feed paper or to carry out printing. The printing process is similar to that of conventional printers, and therefore detailed description thereof will be omitted.

In the digital copying machine of the present invention, because the input image data is compressed after being divided by a specific dividing method according to the number of expanders, a plurality of expanders can be operated efficiently. Therefore, when image data is expanded and printed, printing can be started earlier and the copying speed can be eventually increased.

The operation of the image reader 1 of the present invention will be described hereinafter. In the image reader 1, size (length) of the original document in the auxiliary scanning direction is estimated from the original document width sensed by the document width sensor. And segmentation of blocks corresponding to the original document is set according to the estimated size. In case end of document is detected while compressing image data belonging to a block, compression operation is continued without being interrupted, and the area from the line corresponding to the end of document to a line corresponding to the point where compression of the block ends is stored as an ineffective area. When expanding the block, the image data is expanded by taking the ineffective area into account.

More specifically, in the image reader 1 of the present invention, when image data of an original document is divided into a plurality of blocks and is compressed in the unit of block, length of the original document in the auxiliary scanning direction is estimated from the document width. Then by setting the segmentation of the blocks to be divided based on the estimated document length, the image data is compressed without waiting for the end of image data input for each block, not doing over the compression process even when the end of original document is detected.

Even when the actual length of the original document in the auxiliary scanning direction is different from the estimated length, the last block including the end of original document is compressed as a whole. Then the number of lines of the ineffective area in the last block is stored in the compression image control table, so that the expanded ineffective area will not be written in the output image memory 262 when expanding the compressed image data.

In the description that follows, it is assumed that original document sizes which can be set on the automatic document feeder of the digital copying machine are limited to standard sizes of A3 (297 mm×420 mm), A4 (210 mm×297 mm) and B5 (182 mm×257 mm).

In this case, length of the original document in the auxiliary scanning direction is basically estimated in the following procedure based on the document width (length of the original document in the principal scanning direction).

The first to third document width sensors a to c are arranged against the document stage glass 18 in the arrangement shown in FIG. 3. In case original documents of different sizes are placed in the longitudinal or transverse direction on the document stage glass 18 (longitudinal direction only for A3 size), states of operation (ON/OFF) of the first to third document width sensors a to c are as shown in FIG. 3. Therefore, size and orientation (longitudinal or transverse) of the original document which is set on the document stage glass 18 are determined from the ON/OFF pattern of the first to third document width sensors a to c. When the first to third document width sensors a to c are all ON, it cannot be determined whether A4 size document is placed transversely or A3 size document is placed longitudinally.

Thus when the ON/OFF pattern of the first to third sensors a to c is a: OFF, b: OFF and c: OFF, the original document is determined to be B5 size placed longitudinally, and length thereof in the auxiliary scanning direction is estimated to be 257 mm. When the ON/OFF pattern is a: ON, b: ON and c: OFF, the original document is determined to be B5 size placed transversely, and length thereof in the auxiliary scanning direction is estimated to be 182 mm. When the ON/OFF pattern is a: ON, b: OFF and c: OFF, the original document is determined to be A4 size placed longitudinally, and length thereof in the auxiliary scanning direction is estimated to be 297 mm.

However, when the ON/OFF pattern is a: ON, b: ON and c: ON, it cannot be determined whether the original document is A4 size document placed transversely or A3 size document placed longitudinally. In this case, it is assumed that the original document is A4 size or A3 size, whichever more frequently used. For example, in case A4 size document is more frequently used than A3 size, the original document is assumed to be A4 size placed transversely and its length in the auxiliary scanning direction is estimated to be 210 mm. In most cases, this enables it to correctly estimate the length of the original document in the auxiliary scanning direction. In case the original document is actually A3 size placed longitudinally contrary to the estimate, the last block is compressed including the ineffective area and the ineffective area is removed during expansion of the image data.

When the length of the original document in the auxiliary scanning direction has been estimated, line number upon which compression of the block is to be started is set so that the compression does not overrun the image input operation for each block, and compression is carried out while monitoring the number of lines transferred from the image reader 1 to the input image memory 261. When the paper feed sensor SE51 detects the end of the original document passing thereover, actual document length is determined because the number of remaining input lines can be known from the document transfer speed and the distance between the paper feed sensor and the image reading position. Satisfactory result will be obtained by stopping the compressing operation when compression of blocks up to the determined length has been completed.

In case the actual document length is shorter than the estimated document length, for example when the actual length is 200 mm in spite of estimated length of 297 mm, image data is compressed to separation of block beyond 200 mm, namely 297 mm, and lines in the area from 200 mm to 297 mm are stored as ineffective area of the block in the compression image control table. When there is an ineffective area during expansion of the compressed image, the area is not written in the output image memory.

Although the length of the original document in the auxiliary scanning direction is estimated from the ON/OFF pattern of the first to third sensors a to c, the length of the original document in the auxiliary scanning direction may be estimated from the document width which is determined from the result of reading the original document in the principal scanning direction in the early stage of scanning. In this case, because the portions out of the original document on both sides thereof viewed in the principal scanning direction become completely black, document width can be easily determined by measuring the distance between the black portions on both sides of the original document. In case the document width is about 182 mm, the original document is determined to be B5 size placed longitudinally, while it is determined to be B5 size placed transversely when the width is 257 mm, A4 size placed longitudinally when the width is 210 mm. When the document width is about 297 mm, it cannot be determined whether it is A4 size placed transversely or A3 size placed longitudinally, and therefore whichever more likely is assumed.

The specific method of controlling the image data processing in the image reader 1 of the digital copying machine M will be described hereinafter. FIGS. 16 to 23 are flow charts of the control in the image memory section 2, showing the portions related to the present invention.

Figure 16:
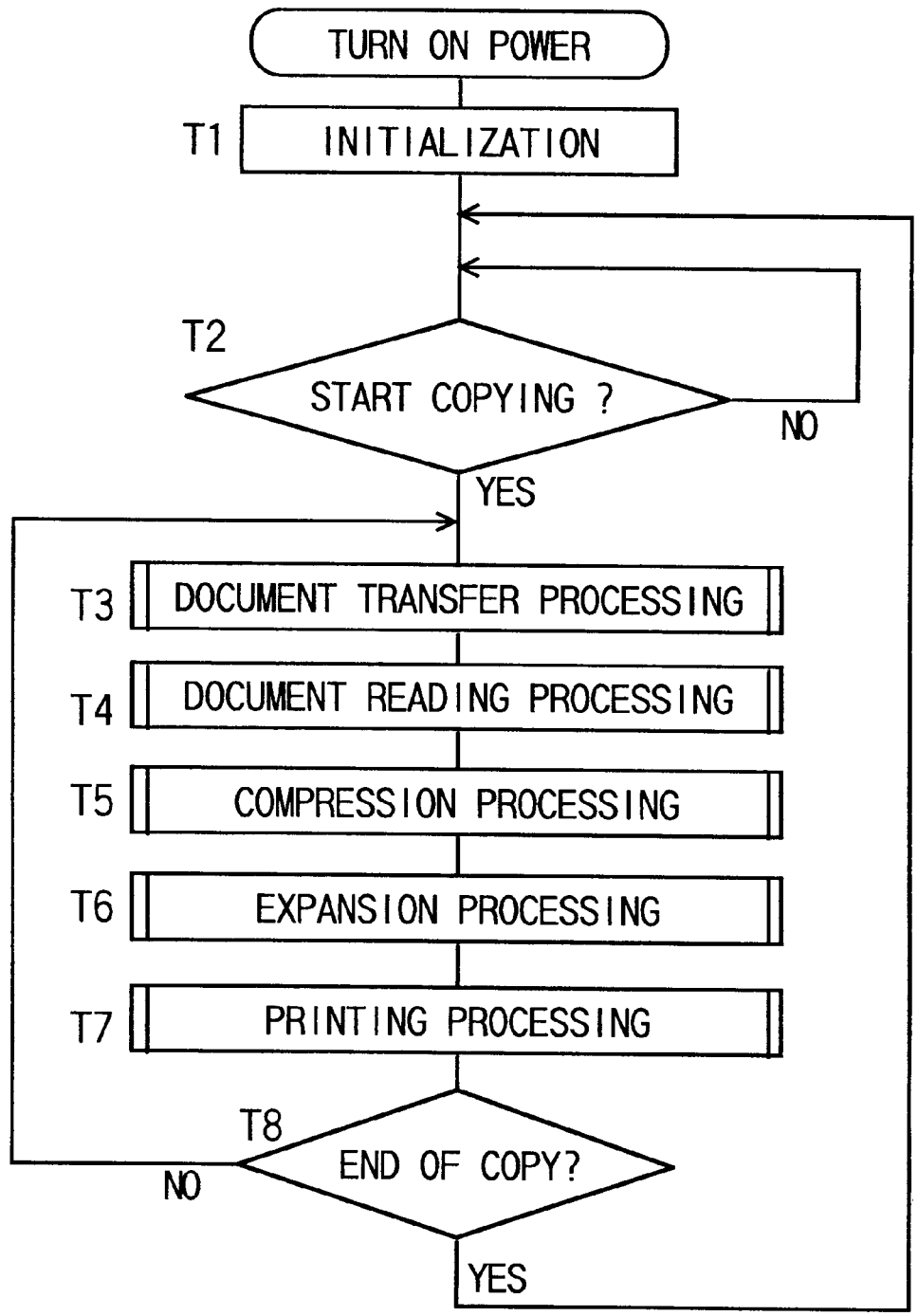
FIG. 16 is a flow chart of a main routine for image data processing control according to the second embodiment of the present invention for the digital copying machine shown in FIG. 1.

FIG. 16 shows a main routine for such control operations. In the main routine, when power is supplied, first the internal status is initialized (step T1). Thereafter, the system remains in standby loop until start copying command is given (NO in step T2). When start copying command is given (YES in step T2), original document transfer process (step T3), original document reading process (step T4), compression process (step T5), expansion process (step T6) and printing process (step T7) are carried out sequentially. These steps (step T3 to step T7) are repeated until copying operation is completed (NO in step T8). When the copying operation is completed (YES in step T8), the system again waits for start copying command.

Figure 17:
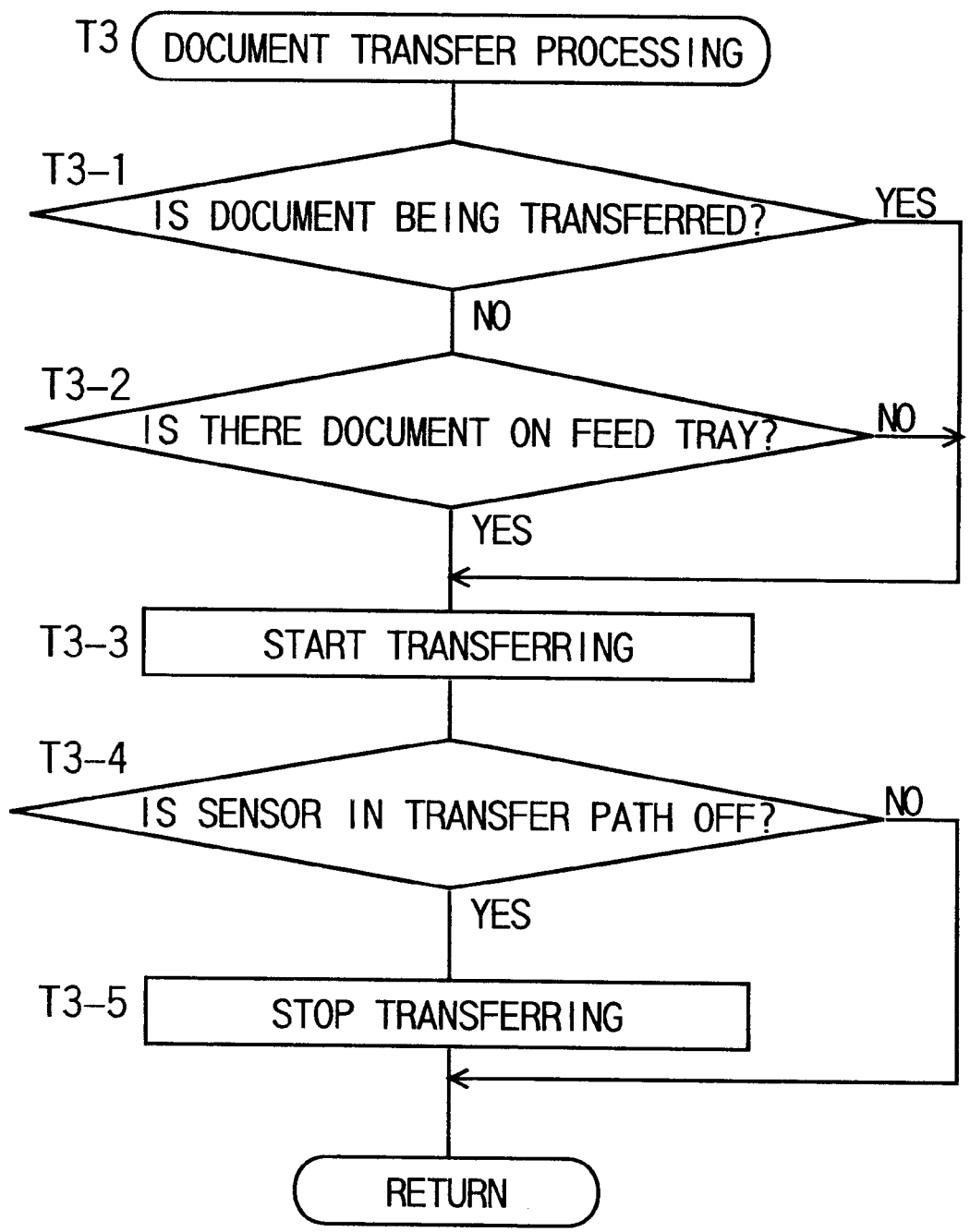
FIG. 17 is a flow chart of a subroutine for original document transferring processing.

FIG. 17 is a flow chart of a subroutine for original document transferring process of step T3 in FIG. 16. In the document transfer subroutine, first it is checked to see whether there is original document being transferred or not (step T3-1). When there is no original document being transferred (NO in step T3-1), it is checked to see whether there is original document on the document feed tray or not (step T3-2). When there is original document on the document feed tray (YES in step T3-2), transfer of the original document is started (step T3-3). In case there is an original document being transferred (YES in step T3-2) and sensors in the transfer route are off (YES in step T3-4), transfer of the original document is stopped (step T3-5).

Figure 18:
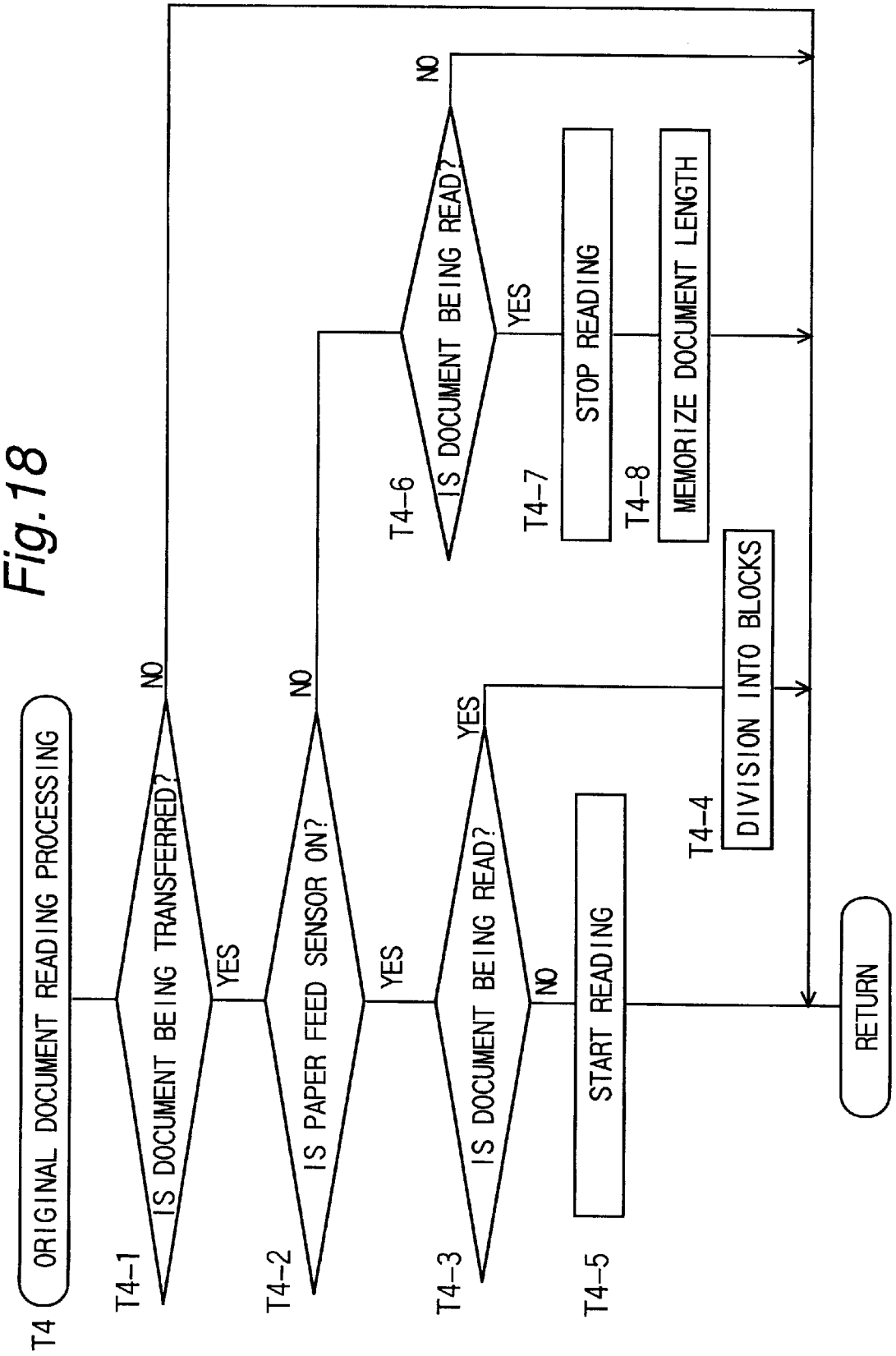
FIG. 18 is a flow chart of a subroutine for original document reading processing.

FIG. 18 is a flow chart of a subroutine for original document reading process of step T4 in FIG. 16. In the document reading subroutine, first it is checked to see whether there is an original document being transferred or not (step T4-1). When there is an original document being transferred (YES in step T4-1), it is checked to see whether the document feed sensor SE51 is on or not (step T4-2). When the document feed sensor SE51 is on (YES in step T4-2), it is further checked to see whether there is an original document being read or not (step T4-3). In case there is an original document being read (YES in step T4-3), image data is divided into blocks (step T4-4). That is, length of the original document in the auxiliary scanning direction is estimated from the document width which is determined by the ON/OFF pattern of the first to third document width sensors a to c. Then the image data is divided into blocks according to the estimated document length, thereby to set the number of lines in each block, timing to enable compression, etc. In case there is no original document being read (NO in step T4-3), reading of the original document is started (step T4-5).

When the document feed sensor SE51 is off (NO in step T4-2), on the other hand, it is further checked to see whether there is an original document being read or not (step T4-6). In case there is an original document being read (YES in step T4-6), reading of the original document is stopped (step T4-7). Because the length of the original document in the auxiliary scanning direction is established at this time, the document length is stored (step T4-8).

Figure 19:
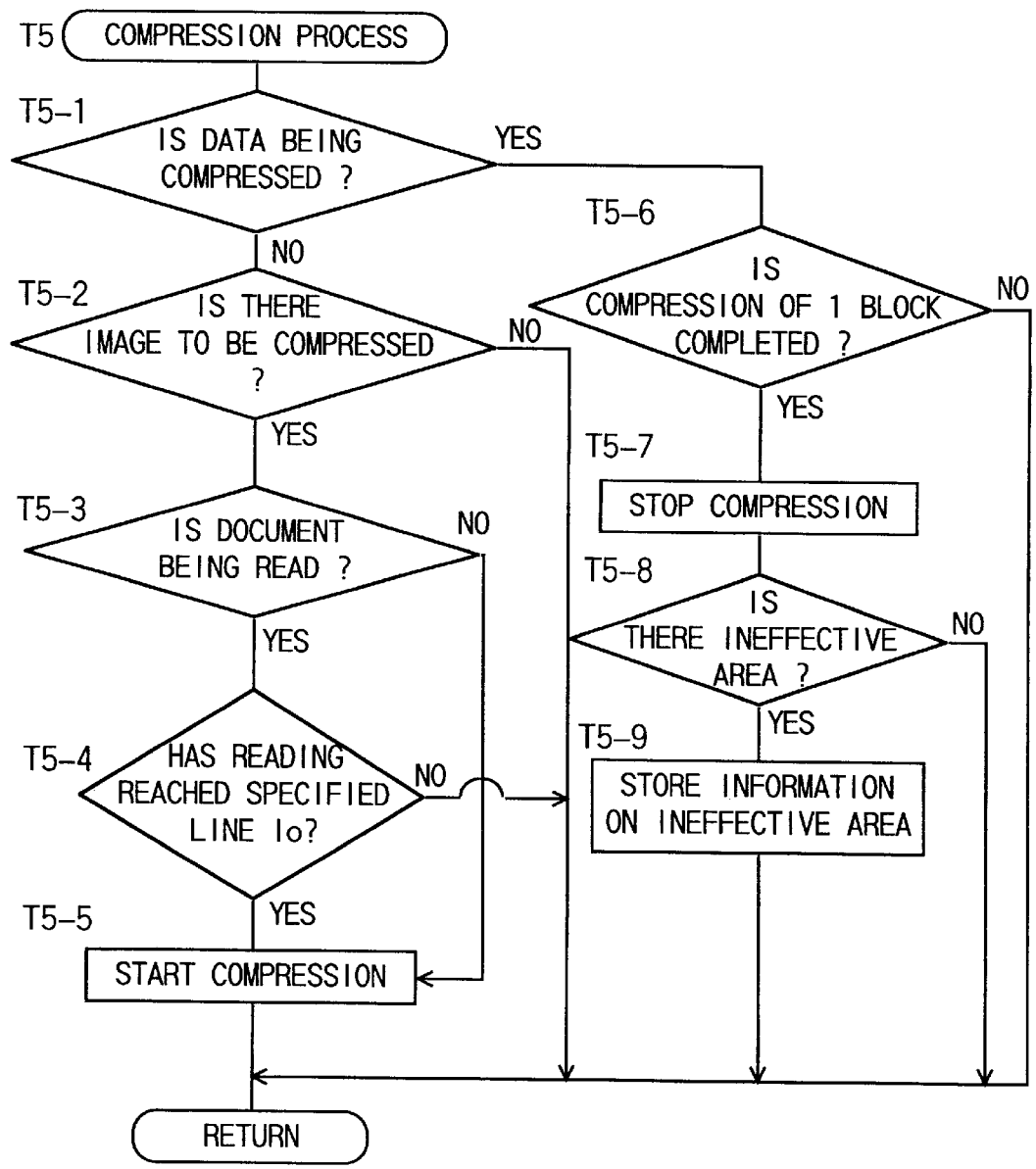
FIG. 19 is a flow chart of a subroutine for compression processing.

FIG. 19 is a flow chart of a subroutine for the compression process of step T5 in FIG. 16. In this compression process subroutine, it is first checked to see whether there is image data being compressed or not (step T5-1). When there is no image data being compressed (NO in step T5-l), it is checked to see whether there is image data to be compressed or not (step T5-2). When there is image data to be compressed (YES in step T5-2), it is further checked to see whether there is image data being read or not (step T5-3). When there is image data being read (YES in step T5-3), it is checked to see whether the number of lines which have been read has reached the proper number of lines to start compression or not (step T5-4). When the proper number of lines to start compression has been reached (YES in step T5-4), compression is started (step T5-5).

In case there is image data being compressed (YES in step T5-1), it is checked to see whether compression of one block has been completed or not (step T5-6). When compression of one block has been completed (YES in step T5-6), compression is stopped (step T5-7) and it is checked to see whether there is an ineffective area or not (step T5-8). When there is an ineffective area (YES in step T5-8), number of lines contained in the ineffective area is registered in the compressed image control table (step T5-9).

Figure 20:
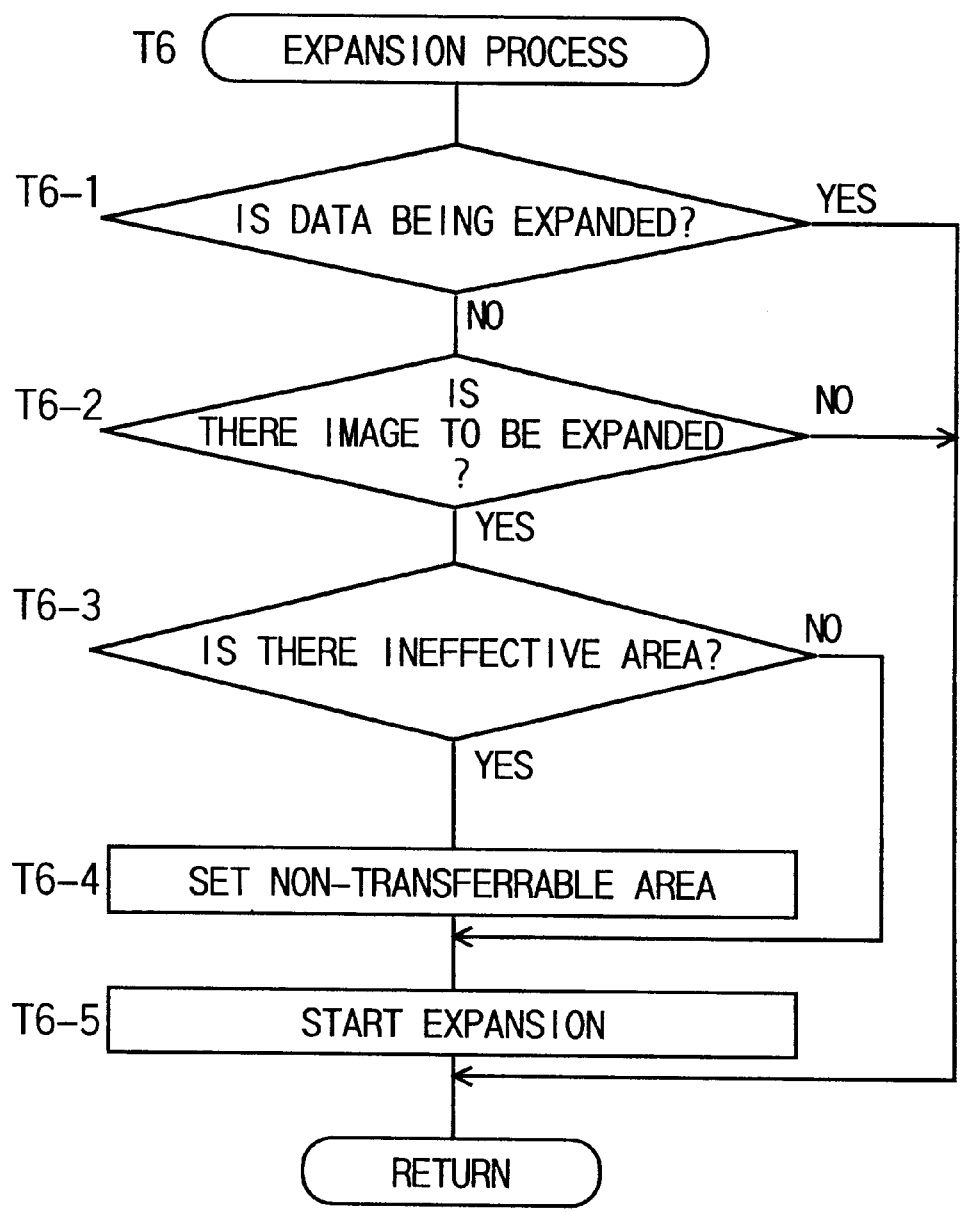
FIG. 20 is a flow chart of a subroutine for expansion processing.

FIG. 20 is a flow chart of a subroutine for the expansion process of step T6 in FIG. 16. In this expansion process subroutine, it is first checked to see whether there is image data being expanded or not (step T6-1). When there is no image data being expanded (NO in step T6-1), the compressed image control table is checked to see whether there is image data to be expanded or not (step T6-2). When there is image data to be expanded (YES in step T6-2), it is checked to see whether there is an ineffective area or not (step T6-3). When there is an ineffective area (YES in step T6-3), non-transferable area which is not to be transferred to the output memory is specified in the image data to be expanded (step T6-4), and then expansion is started (step T6-5). Transmission of the image data is carried out by the DMAC 27.

Figure 21:
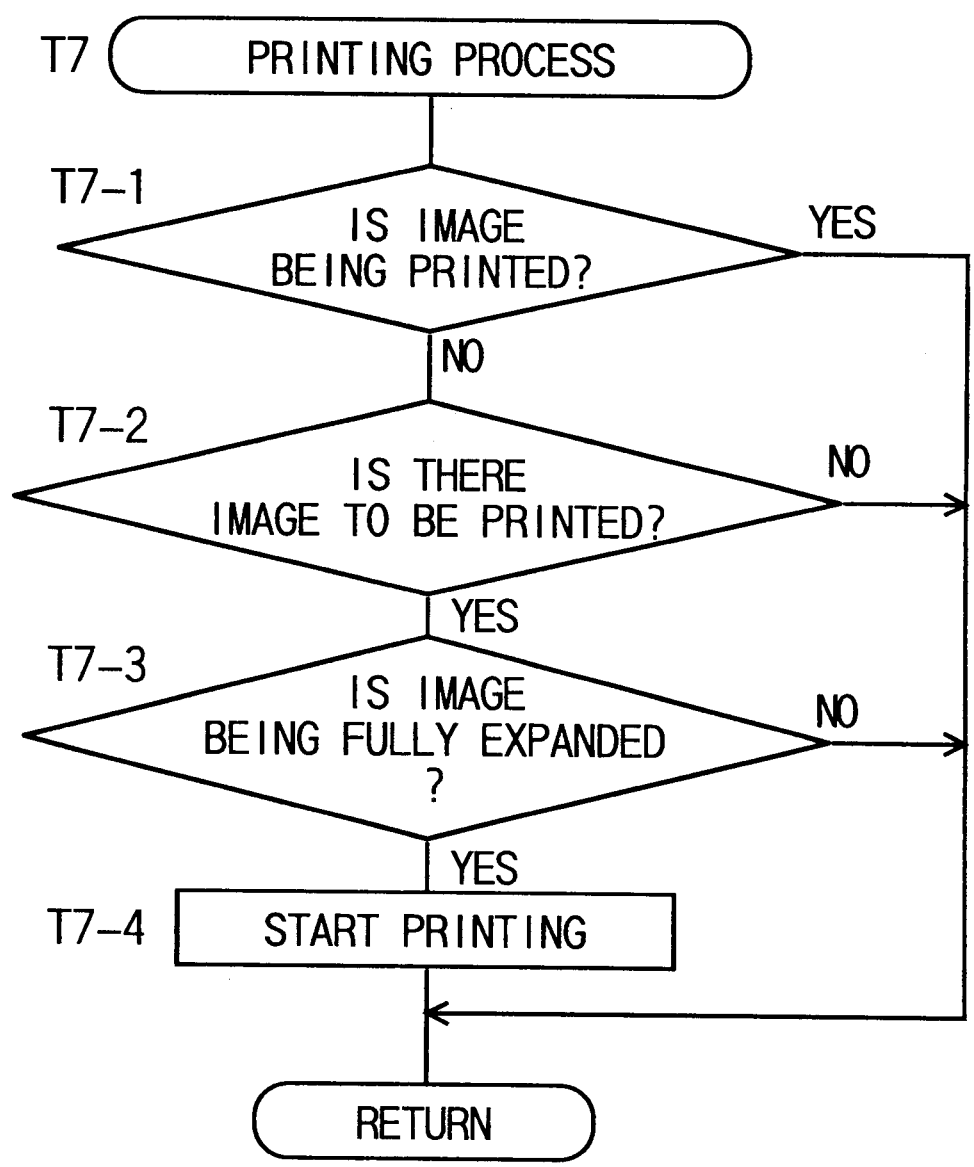
FIG. 21 is a flow chart of a subroutine for printing processing.

FIG. 21 is a flow chart of a subroutine for printing process of step T7 in FIG. 16. In this printing process subroutine, it is first checked to see that there is no image data being printed (NO in step T7-1). Then, in case there is image data to be printed (YES in step T7-2), after confirming that the image data has been fully expanded (YES in step T7-3), printing process is started (step T7-4).

In this printing process, after starting the DMAC 27, the printer section 3 is requested via the control signal line a to feed paper and to carry out printing. The printing process is similar to that of the conventional printers, and therefore detailed description thereof will be omitted.

Figure 22:
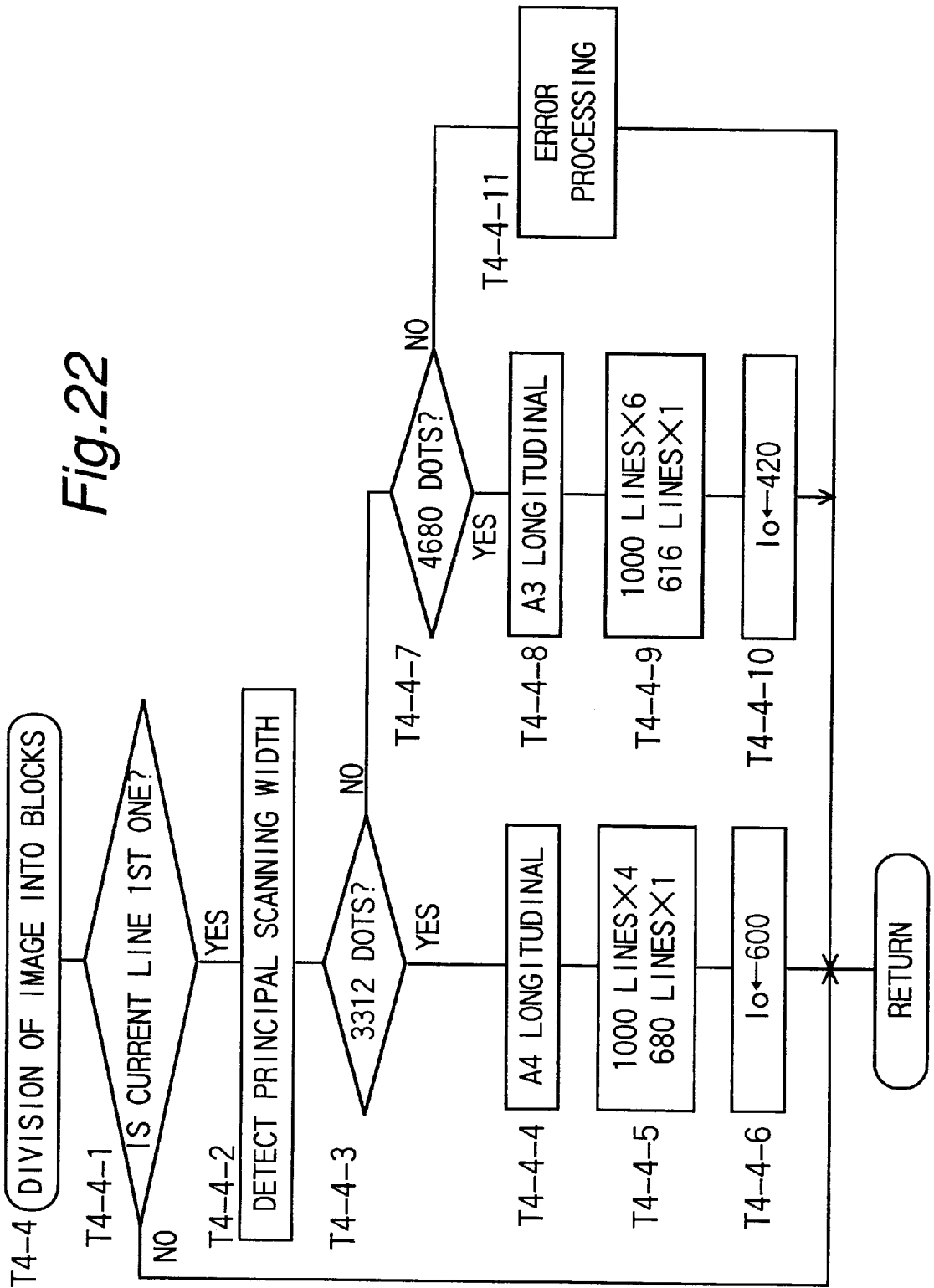
FIG. 22 is a flow chart of a subroutine for the processing of dividing image data into blocks.

FIG. 22 is a flow chart of a subroutine for image data division process of step T4-4 in FIG. 18. In this image division process subroutine, it is first checked to see whether the first line of the original document is being scanned or not (step T4-4-1). When the first line of the original document is being scanned (YES in step T4-4-1), principal scanning width of the original document, namely the size of the original document in the principal scanning direction is sensed (step T4-4-2). Because it is assumed that the image of the original document is converted to data of 400 dpi, principal scanning width of the original document of A4 size placed longitudinally corresponds to 3312 dots (pixels) and auxiliary scanning width corresponds to 4680 dots. In the case of A4 size placed transversely, principal scanning width corresponds to 4680 dots and auxiliary scanning width corresponds to 3312 dots. In the case of A3 size placed longitudinally, principal scanning width corresponds to 4680 dots and auxiliary scanning width corresponds to 6612 dots.

Then it is checked to see whether the principal scanning width corresponds to 3312 dots (original document is A5 size placed transversely or A4 size placed longitudinally), 4680 dots (original document is A4 size placed transversely or A3 size placed longitudinally), or otherwise (step T4-4-3 and step T4-4-7). In case the principal scanning width corresponds to 3312 dots (YES in step T4-4-3), the original document is assumed to be A4 size placed longitudinally (step T4-4-4). In this case, image data for one sheet of document is divided in the auxiliary scanning direction into 4 blocks each comprising 1000 lines and one block comprising 680 lines (step T4-4-5). Then number of lines $l_0$ before starting compression, which minimizes the time taken from the start of reading to the completion of compression within such a range as compression does not overrun reading, is set to 600 (step T4-4-6).

The number of lines $l^0$ before starting compression is set in such a procedure as outlined below.

The image reader sends image data to the input ring buffer at a rate of 320 mm multiplied by the number of dots in one horizontal line of the image per second (number of lines transmitted per unit time is the same even for scaling copy).

Thus denoting the number of dots arranged in horizontal direction (principal scanning direction) of the input ring buffer as Nd, rate Vin of reading the image data into the input ring buffer per unit time is given by equation 1.

$$\text{Vin (bps)} = 320/25.4 * 400 * Nd \qquad \text{Equation 1}$$

Assuming that the number of lines contained in one block is set to Y and that the image data is compressed block by block, compression cannot be started until image data up to line number given by equation 2 has been input, in order to prevent the compression process from overrunning the input process at the maximum compression speed Ven in the block (e.g. 40E6 bps).

$$l_o = Y * (\text{Ven} - \text{Vin}) / \text{Ven (line)} \qquad \text{Equation 2}$$

Therefore, when the number Y of lines contained in one block is set to 1000, number $l_0$ of lines which have been read to enable start of compression is given by equation 3.

$$l_0 = 1000 * (\text{Ven} - 320/25.4 * 400 * Nd) / \text{Ven} \qquad \text{Equation 3}$$

Denoting the number of words contained in a horizontal row of the input ring buffer as RW, number $l_0$ of lines which have been read to enable start of compression is given by equation 4.

$$l_0=1000-1000*320/25.4*400*RW*16/Ven \quad \text{Equation 4}$$

Thus when reading an original document of A4 size placed longitudinally, RW=207 and therefore number $l_0$ of lines which have been read to enable start of compression becomes 596.7 (=600). When reading an original document of A3 size placed longitudinally, RW=293 and therefore number $l_0$ of lines which have been read to enable start of compression becomes 419.2 (=420).

Because the image transfer clock speed is 27 Mbps, reading process may overrun the compression process instantaneously at the last line. This makes it necessary to provide a margin of several lines.

In case the principal scanning width corresponds to 4680 dots (NO in step T4-4-3, YES in step T4-4-7), the original document is assumed to be A3 size placed longitudinally (step T4-4-8). In this case, image data for one sheet of document is divided in the auxiliary scanning direction into 6 blocks each comprising 1000 lines and one block comprising 616 lines (step T4-4-9). Then number of lines $l_0$ before starting compression is set to 420 (step T4-4-10).

In case the principal scanning width does not correspond to 3312 dots nor 4680 dots (NO in step T4-4-3, NO in step T4-4-7), the original document is assumed to be of non-standard size, and an error processing routine is carried out (step T4-4-11).

Figure 23:
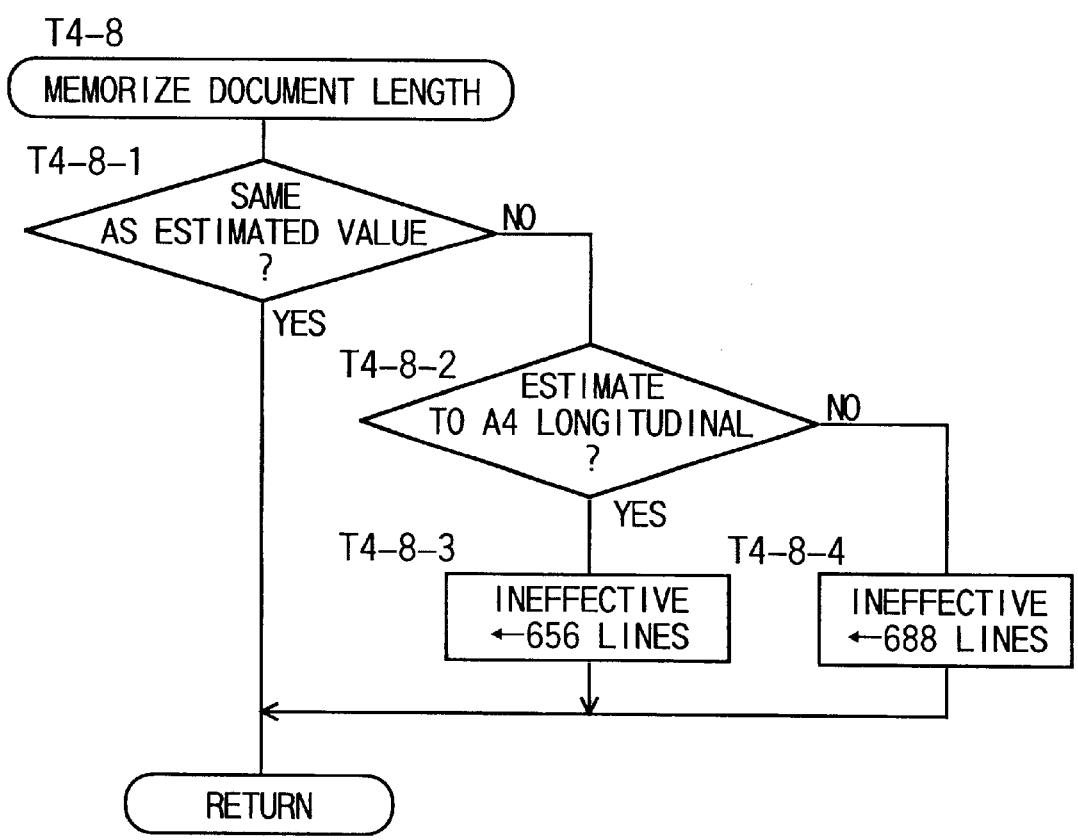
FIG. 23 is a flow chart of a subroutine for storing original document length.

FIG. 23 is a flow chart of a subroutine for document length storing process of step T4-8 in FIG. 18. In the document length storing process subroutine, it is first checked to see whether length of the original document in the auxiliary scanning direction is substantially the same as the value estimated in step 4—4 or not (step T4-8-1). When both lengths are not the same (NO in step T4-8-1), it is checked to see whether the above estimate means A4 size placed longitudinally or not (step T4-8-2). When it is A4 size placed longitudinally (YES in step T4-8-2), length of ineffective area in the auxiliary scanning direction is set to 656 lines (1000−344= 656) because the original document is actually A5 size placed transversely (step T4-8-3). Because the total number of dots in the auxiliary scanning direction is 2344 in the case of A5 size document placed transversely, number of lines included in the last block is 344, not 1000.

When the estimate is not A4 size placed longitudinally (NO in step T4-8-2), namely it is A3 size placed longitudinally, length of ineffective area in the auxiliary scanning direction is set to 688 lines (1000−312=688) because the original document is actually A4 size placed transversely (step T4-8-4). Because the total number of dots in the auxiliary scanning direction is 3312 in the case of A4 size document placed transversely, number of lines included in the last block is 312, not 1000.

In the image reader 1, as described above, because length of original document is estimated when the document length in the auxiliary scanning direction is unknown at the start of reading, so that the image data is divided into a plurality of blocks according to the estimate, compression of the image data can started earlier and the time taken in reading and compression of the image data can be minimized.

Although the present invention is described above taking specific embodiments as examples, it will be understood by those skilled in the art that the present invention is not limited to these embodiments, but covers all modifications which are within the scope and spirit of the present invention as defined by the appended claims.

What is claimed is:

1. A digital copying machine comprising:
    a document reader for reading an original document and generating image information corresponding to the original document;
    an image information dividing manager for dividing the image information into a plurality of image information blocks along at least an auxiliary scanning direction, wherein the number of image information blocks along the auxiliary scanning direction is set equal to an integer number greater than one times the number of expansion devices;
    a compression device which compresses the image information on a per block basis;
    a plurality of expansion devices which expand the compressed image information, in parallel, on the per block basis, and in an order such that expansion of a current row of blocks is completed prior to beginning expansion of any blocks from a next row, and such that none of the expansion devices are required to suspend operation to permit completing the expansion of said current row of blocks; and
    a printing device for printing a duplicate image of the original document according to the expanded image information.

2. The digital copying machine according to claim 1, further comprising an image data editor capable of rotating the compressed image information by 90° and wherein the expansion devices expand the rotated blocks of compressed image information in an order such that expansion of a current row of blocks is completed prior to beginning expansion of any blocks from a next row, and such that none of the expansion devices are required to suspend operation to permit completing the expansion of said current row of blocks.

3. The digital copying machine according to claim 2, wherein the compression device comprises a plurality of compression devices equal in number to the plurality of expansion devices.

4. The digital copying machine according to claim 2, wherein each of the image information blocks is of an equal size.

5. The digital copying machine according to claim 2, further comprising a block assigning device for assigning the blocks of compressed image information to the expansion devices in a manner facilitating continuous operation of each expansion device during expansion of all the compressed image information.

6. The digital copying machine according to claim 2, wherein the order of expanding the blocks of compressed image information depends on whether the compressed image information has been rotated by the image data editor.

7. The digital copying machine according to claim 2, wherein the printing device is configured to carry out printing processing in parallel with the expansion processing of the expansion devices.

8. The digital copying machine according to claim 1, further comprising:
    a compression device which compresses the image data, stored in the input image memory, in the unit of blocks;
    a document width sensor for sensing the width of the original document; and
    a block partition setting device for estimating the size of the original document in the auxiliary scanning direction from the original document width sensed by the document width sensor, and setting the partition of blocks corresponding to the original document based on the estimated size.

9. The image reading device according to claim 8, wherein the compression device is configured to start compression of image data belonging to a block before generation of image data belonging to the block is completed.

10. An image scanning device comprising:

a document reader for reading an original document and generating image data corresponding to the original document;

an input image memory for storing the image data generated by the document reader;

an image data dividing manager for dividing the image data stored in the input image memory into a plurality of blocks arranged along an auxiliary scanning direction;

a compression device which compresses the image data on a per block basis;

an expansion device which expands the compressed image data on the per block basis;

an end of document detector for detecting an end of the original document in the auxiliary scanning direction; and an ineffective area detector which, when the end of document detector detects the end of the original document during compression of image data belonging to one block, sets an area from the end of the original document to the end of the one block as an ineffective area, which causes the expansion device to terminate expansion of the one block upon reaching the ineffective area.

11. The image reading device according to claim 10, further comprising an original document transfer mechanism which transfers the original document to an original document reading position.

12. The image reading device according to claim 11, wherein reading of the original document is carried out by transferring the original document during reading of the original document by the document reader.

13. A method of image processing, performed in an image forming device that comprises a plurality of expansion devices for expanding compressed data, said method comprises the steps of:

reading an original document and generating image information which corresponds to the original document;

dividing the image information into a plurality of image information blocks along at least an auxiliary scanning direction, wherein the number of image information blocks along the auxiliary scanning direction is set to an integer number greater than one times the number of expansion devices;

compressing the image information on a per block basis;

expanding the compressed image information in parallel, on the per block basis, by the plurality of expansion devices, in an order such that expansion of a current row of blocks is completed prior to beginning expansion of any blocks from a next row, and such that none of the expansion devices are required to suspend operation to permit completing the expansion of said current row of blocks; and reproducing an image of the original document by printing the expanded image information on paper sheets.

14. The method of image processing according to claim 13, further comprising, before the step of expanding the compressed image information, the step of rotating the image information by 90°, and wherein the expansion devices expand the rotated blocks of compressed image information in an order such that expansion of a current row of blocks is completed prior to beginning expansion of any blocks from a next row, and such that none of the expansion devices are required to suspend operation to permit completing the expansion of said current row of blocks.

15. The method of image processing according to claim 14, wherein printing of images is carried out successively according to expanded image information before expansion of all image information is completed.

16. The method of image processing according to claim 13, further comprising the steps of: sensing the original document width; and estimating the size of the original document in the auxiliary direction from the document width and setting the partition of blocks corresponding to the original document based on the estimated size.

17. The method of image processing according to claim 16, wherein compression of image data belonging to one block is started before generation of the image data belonging to the block is completed in the step of compressing the image data.

18. A method of image processing, performed in an image forming device that comprises an expansion device for expanding compressed data, said method comprises the steps of:

reading an original document and generating image data which corresponds to the original document;

storing the image data in an input image memory;

dividing the image data stored in the input image memory into a plurality of blocks along an auxiliary scanning direction;

compressing the image data on a per block basis;

expanding the compressed image data on the per block basis;

sensing an end of the original document in the auxiliary scanning direction; and when the end of the original document is sensed during compression of image data belonging to one block, setting an area from the end of the original document to the end of the one block as an ineffective area and causing the expansion device to terminate expansion of the one block upon reaching the ineffective area.

* * * * *